(12) United States Patent
King et al.

(10) Patent No.: US 9,297,486 B2
(45) Date of Patent: Mar. 29, 2016

(54) PIPE FITTINGS WITH INSERT RETAINING SEALS AND RELATED METHODS

(75) Inventors: Thomas A. King, Chesterfield, MO (US); Duane K. Smith, St. Charles, MO (US); Douglas L. Kirk, Ballwin, MO (US)

(73) Assignee: Blazing Products, Inc., Chesterfield, MO (US)

( * ) Notice: Subject to any disclaimer, the term of this patent is extended or adjusted under 35 U.S.C. 154(b) by 691 days.

(21) Appl. No.: 13/465,163

(22) Filed: May 7, 2012

(65) Prior Publication Data

US 2012/0217738 A1    Aug. 30, 2012

Related U.S. Application Data

(63) Continuation-in-part of application No. 12/416,814, filed on Apr. 1, 2009, which is a continuation-in-part of application No. 11/868,231, filed on Oct. 5, 2007, now Pat. No. 8,172,276.

(60) Provisional application No. 61/041,520, filed on Apr. 1, 2008, provisional application No. 60/914,669, filed on Apr. 27, 2007, provisional application No. 60/850,219, filed on Oct. 6, 2006.

(51) Int. Cl.
   *F16L 37/20*    (2006.01)
   *F16L 37/092*   (2006.01)
   *F16L 37/091*   (2006.01)
   *F16L 37/138*   (2006.01)

(52) U.S. Cl.
   CPC ............ *F16L 37/092* (2013.01); *F16L 37/091* (2013.01); *F16L 37/138* (2013.01); *F16L 37/20* (2013.01); *F16L 2201/10* (2013.01); *Y10T 29/49938* (2015.01)

(58) Field of Classification Search
   USPC ......... 285/109, 113, 239, 242, 249, 255, 258, 285/337–339, 342, 347
   See application file for complete search history.

(56) References Cited

U.S. PATENT DOCUMENTS

| | | | |
|---|---|---|---|
| 15,846 A | 10/1856 | Ferry |
| 105,818 A | 7/1870 | Lord |
| 224,586 A | 2/1880 | Earle |
| 278,961 A | 6/1883 | Hobbs |
| 484,656 A | 10/1892 | Doolittle |
| 535,880 A | 3/1895 | Anderson |

(Continued)

OTHER PUBLICATIONS

Olson Irrigation Systems EZ-E11, http://www.olsonirrigation.com/PROD/OISEZEL/OLSezel.html, web page printed Feb. 27, 2007.

(Continued)

*Primary Examiner* — Aaron Dunwoody
*Assistant Examiner* — Fannie Kee
(74) *Attorney, Agent, or Firm* — Schroeder & Siegfried, P.A.

(57) ABSTRACT

A fitting connectable to an end portion of a pipe generally includes an insert member configured to be received at least partly within the end portion of the pipe, and a retention member coupled to the insert member and configured to be received at least partly within the end portion of the pipe. The retention member operates in conjunction with the insert member to engage the end portion of the pipe and impart an increased force against an inner wall of the pipe in response to an increase of internal pipe pressure, thereby frictionally securing the end portion of the pipe on the insert member as internal pipe pressure increases during use.

15 Claims, 12 Drawing Sheets

(56) References Cited

U.S. PATENT DOCUMENTS

| | | | |
|---|---|---|---|
| 545,066 A | 8/1895 | Fregeau |
| 567,962 A | 9/1896 | Cooper |
| 589,216 A | 8/1897 | McKee |
| 651,134 A | 6/1900 | Dickens |
| 679,399 A | 7/1901 | Smith et al. |
| 781,952 A | 2/1905 | Jones |
| 1,370,739 A | 3/1921 | Gay |
| 1,606,320 A | 11/1926 | Scott |
| 1,802,499 A | 4/1931 | Chapman |
| 1,928,316 A | 9/1933 | Muto |
| 2,332,350 A | 10/1943 | Scritchfield |
| 2,344,163 A | 3/1944 | Misch |
| 2,478,586 A | 8/1949 | Krapp |
| 2,793,055 A | 5/1957 | Meyerhoefer |
| 2,833,567 A | 5/1958 | Bacher et al. |
| 2,839,075 A | 6/1958 | Mueller |
| 2,978,262 A | 4/1961 | Franck |
| 3,154,329 A | 10/1964 | Skinner |
| 3,158,388 A | 11/1964 | Marshall |
| 3,162,211 A | 12/1964 | Barusch |
| 3,167,335 A | 1/1965 | Maisch |
| 3,258,822 A | 7/1966 | Schlesch et al. |
| 3,280,846 A | 10/1966 | Anderson et al. |
| 3,343,724 A | 9/1967 | Malpas |
| 3,432,188 A | 3/1969 | Turner |
| 3,439,942 A | 4/1969 | Moore et al. |
| 3,460,715 A | 8/1969 | Lane et al. |
| 3,460,721 A | 8/1969 | Hamel et al. |
| 3,471,176 A | 10/1969 | Gilchrist |
| 3,489,441 A | 1/1970 | Malcolm |
| 3,495,615 A | 2/1970 | Ehrens et al. |
| 3,509,905 A | 5/1970 | Mullins |
| 3,554,217 A | 1/1971 | Ehrens |
| 3,580,269 A | 5/1971 | Ehrens |
| 3,633,948 A | 1/1972 | Dickey |
| 3,720,235 A * | 3/1973 | Schrock ............ 138/137 |
| 3,756,267 A | 9/1973 | Hutton |
| 3,762,263 A | 10/1973 | Bocceda |
| 3,825,286 A | 7/1974 | Henry, III |
| 3,891,150 A | 6/1975 | Hoff et al. |
| 3,990,729 A | 11/1976 | Szentmihaly et al. |
| 3,999,785 A | 12/1976 | Blakeley |
| 4,034,802 A | 7/1977 | Schwarz |
| 4,076,038 A | 2/1978 | Wynne |
| 4,112,944 A | 9/1978 | Williams |
| 4,158,461 A | 6/1979 | Francis |
| 4,183,120 A | 1/1980 | Thorne |
| 4,212,487 A | 7/1980 | Jones et al. |
| 4,222,593 A | 9/1980 | Lauffenburger |
| 4,225,162 A | 9/1980 | Dola |
| 4,239,265 A | 12/1980 | King, Sr. |
| 4,258,742 A | 3/1981 | Louthan et al. |
| 4,364,406 A | 12/1982 | Bohlin |
| 4,373,235 A | 2/1983 | Korgaonkar |
| 4,396,210 A | 8/1983 | Spencer et al. |
| 4,434,809 A | 3/1984 | Rogstadius |
| 4,522,339 A | 6/1985 | Costa |
| 4,540,011 A | 9/1985 | Croxford et al. |
| 4,557,024 A | 12/1985 | Roberts et al. |
| 4,574,443 A | 3/1986 | Persak et al. |
| 4,647,075 A | 3/1987 | Vargo |
| 4,730,636 A | 3/1988 | Volgstadt et al. |
| 4,763,932 A | 8/1988 | Matz et al. |
| 4,789,189 A | 12/1988 | Robertson |
| D307,541 S | 5/1990 | Tres |
| 4,935,992 A | 6/1990 | Due |
| 5,054,820 A | 10/1991 | Lesquir et al. |
| 5,076,318 A | 12/1991 | Fedora |
| 5,095,564 A | 3/1992 | Kruger |
| 5,105,844 A | 4/1992 | King, Sr. |
| 5,157,815 A | 10/1992 | Dyer |
| 5,216,784 A | 6/1993 | Dyer |
| 5,241,981 A | 9/1993 | Ahern |
| 5,345,964 A | 9/1994 | Friedel |
| 5,425,395 A | 6/1995 | Brennan |
| 5,518,278 A | 5/1996 | Sampson |
| 5,577,529 A | 11/1996 | Katz |
| 5,609,181 A | 3/1997 | Evans |
| 5,640,991 A | 6/1997 | King |
| 5,671,770 A | 9/1997 | Rusche et al. |
| 5,694,972 A | 12/1997 | King |
| 5,732,732 A | 3/1998 | Gross et al. |
| 5,846,412 A | 12/1998 | Tharp |
| 5,896,885 A | 4/1999 | Svetlik |
| 5,921,586 A | 7/1999 | Prassas et al. |
| 5,964,240 A | 10/1999 | Granovski |
| 5,964,241 A | 10/1999 | King |
| 5,967,168 A | 10/1999 | Kitani et al. |
| 6,012,475 A | 1/2000 | Taylor et al. |
| 6,015,168 A | 1/2000 | Fahl |
| 6,062,607 A | 5/2000 | Bartholomew |
| 6,089,619 A | 7/2000 | Goda |
| 6,216,723 B1 | 4/2001 | King |
| 6,220,635 B1 | 4/2001 | Vitel et al. |
| 6,357,472 B1 | 3/2002 | King |
| 6,439,620 B1 | 8/2002 | Guest |
| 6,473,943 B1 | 11/2002 | Thacker |
| 6,510,865 B2 | 1/2003 | King |
| 6,601,605 B2 | 8/2003 | King, Jr. |
| 6,767,033 B2 | 7/2004 | King et al. |
| 6,773,036 B1 | 8/2004 | King |
| 6,791,031 B1 | 9/2004 | Manning |
| 6,986,532 B1 | 1/2006 | King |
| 2001/0032667 A1 | 10/2001 | King, Jr. et al. |
| 2002/0163191 A1 | 11/2002 | Muenster et al. |

OTHER PUBLICATIONS

Why Blu-Lock, The Future of Irrigation Installation, http://www.blulock.com/why.html, web page printed Apr. 12, 2007.

* cited by examiner

PIPE FITTINGS WITH INSERT RETAINING SEALS AND RELATED METHODS

CROSS-REFERENCE TO RELATED APPLICATIONS

This application is a continuation-in-part of U.S. patent application Ser. No. 12/416,814, filed Apr. 1, 2009, which is a continuation-in-part of U.S. patent application Ser. No. 11/868,231, filed Oct. 5, 2007. U.S. patent application Ser. No. 12/416,814 also claims the benefit of U.S. Provisional Patent Application No. 61/041,520, filed Apr. 1, 2008, and U.S. patent application Ser. No. 11/868,231 claims the benefit of U.S. Provisional Patent Application No. 60/914,669, filed Apr. 27, 2007 and U.S. Provisional Patent Application No. 60/850,219, filed Oct. 6, 2006. The entire disclosures of each of the above applications are incorporated herein by reference.

FIELD

The present disclosure relates generally to fittings for pipes and, more particularly, to fittings connectable to end portions of pipes, for example, for closing the pipes, connecting the pipes to one or more additional pipes, connecting the pipes to irrigation sprinklers, etc.

BACKGROUND

This section provides background information related to the present disclosure which is not necessarily prior art.

A pipe fitting may be connected to an end portion of a pipe used in transporting fluid (e.g., liquid, gas, etc.), for example, for closing the pipe, connecting the pipe to one or more other pipes, changing the direction of fluid flow through the pipe, connecting the pipe to one or more other pipes having similar diameters and/or different diameters, etc. In addition, in irrigation systems, fittings may be used for connecting an end of a pipe to one or more irrigation sprinklers.

Some pipe fittings may include a barb receivable within an end portion of a pipe. In these fittings, a clamp is often fastened over the pipe, adjacent where the barb is received within the end portion of the pipe, for compressing the pipe against the barb to form a sealed connection between the fitting and the pipe. However, fastening the clamp around the pipe can be burdensome and time consuming and typically requires one or more tools. As an alternative, a sealant or adhesive compound may be used to bond and/or seal the barb within the end portion of the pipe. However, the sealant or adhesive compound often requires time to set before the connection is secure and further work can be performed.

SUMMARY

This section provides a general summary of the disclosure, and is not a comprehensive disclosure of its full scope or all of its features.

According to various aspects, example embodiments are provided of fittings connectable to end portions of pipes. In one example embodiment, a fitting connectable to an end portion of a pipe generally includes an insert member configured to be received at least partly within an end portion of a pipe, and a retention member coupled to the insert member and configured to be received at least partly within the end portion of the pipe. The retention member engages an inner surface of the end portion of the pipe to help frictionally secure the end portion of the pipe on the insert member when the insert member is received at least partly within the end portion of the pipe. This retention member may take the form of a movable or expandable sleeve element, a compressible sealing member, or a combination of both.

In still another example embodiment, a fitting connectable to an end portion of a pipe generally includes a housing configured for receiving at least part of an end portion of a pipe into the housing, and an insert member disposed at least partly within the housing. The insert member is configured to be received at least partly within the end portion of the pipe when at least part of the end portion of the pipe is received into the housing. The insert member includes a flange, and the housing connects to the insert member at the flange. The insert member may include a retention member similar to that described above, and/or the housing may optionally incorporate an external retention member for engaging the outer surface of a pipe received therein.

Example embodiments are also provided of methods for connecting fittings to pipes. In one example embodiment, a method for connecting a fitting to an end portion of a pipe generally includes positioning the fitting relative to the end portion of the pipe such that an insert member of the fitting is inserted into an inner passageway of the end portion of the pipe, and engaging an inner surface of the pipe with a retention member to apply pressure to at least part of the pipe to retain the fitting on the pipe.

Example embodiments are also provided for methods of retaining fittings on end portions of pipes. In one example embodiment, a method generally includes engaging an inner surface of an end portion of a pipe with a retention member to apply pressure to at least part of the inner surface of the end portion of the pipe to retain the fitting on the end portion of the pipe. In another example embodiment, a method generally includes engaging the outer surface of an end portion of pipe with an external retention member formed in a housing Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
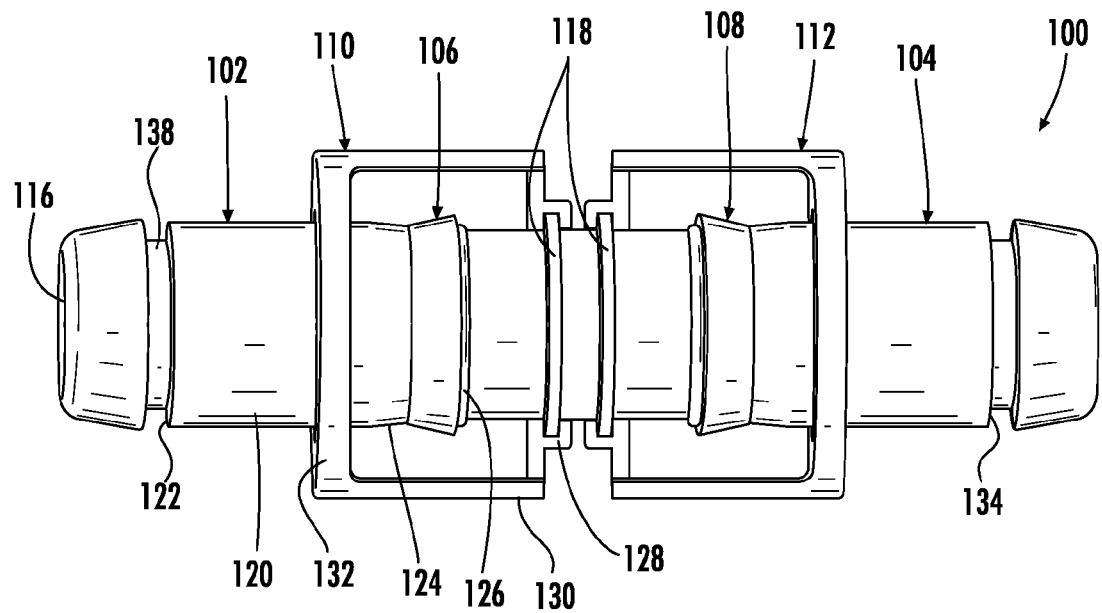
FIG. 1 is a side elevation view of an example embodiment of a fitting connectable to end portions of pipes, for example, for connecting two pipes together.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference now to the drawings, FIGS. 1-3B illustrate an example embodiment of a fitting 100 connectable to end portions of pipes (not shown). The illustrated fitting 100 can be used to connect two similarly sized pipes together. In other example embodiments, fittings may be used, for example, for terminating, or closing, a pipe; for connecting three or more pipes together; for connecting pipes to irrigation sprinklers; for connecting pipes to valves; for connecting pipes to other dissimilar tubing, pipes, etc.; for connecting differently sized pipes together; etc. Pipes, as used herein, may include, for example, irrigation pipes, tubing, etc. and may be used, for example, for transporting fluid (e.g., liquid, gas, etc.), etc. between desired locations.

As shown in FIG. 1, the illustrated fitting 100 generally includes first and second generally tubular-shaped insert members 102 and 104 and first and second circular-shaped sleeves 106 and 108 (broadly, retention members). The illustrated fitting 100 also generally includes first and second collars 110 and 112 (also termed, housings, etc.). The insert members 102 and 104, the sleeves 106 and 108, and the collars 110 and 112 are each configured (e.g., sized, shaped, constructed, etc.) for use in connecting the fitting 100 to two individual pipes, to thereby interconnect the two individual pipes. The illustrated fitting 100 is formed such that the first and second insert members 102 and 104 are an integral, or monolithic, structure. However, the first and second insert members 102 and 104 may be formed separately and coupled together to form the fitting 100 within the scope of the present disclosure. The first and second insert members 102 and 104, the first and second sleeves 106 and 108, and the first and second collars 110 and 112 are configured (e.g., sized, shaped, constructed, etc.) to cooperatively receive end portions of pipes over the respective insert members 102 and 104 and into the respective collars 110 and 112. And together, the insert members 102 and 104, the sleeves 106 and 108, and the collars 110 and 112 cooperate to retain the fitting 100 on the pipes (e.g., by frictionally engaging the pipes, etc.).

Figure 2:
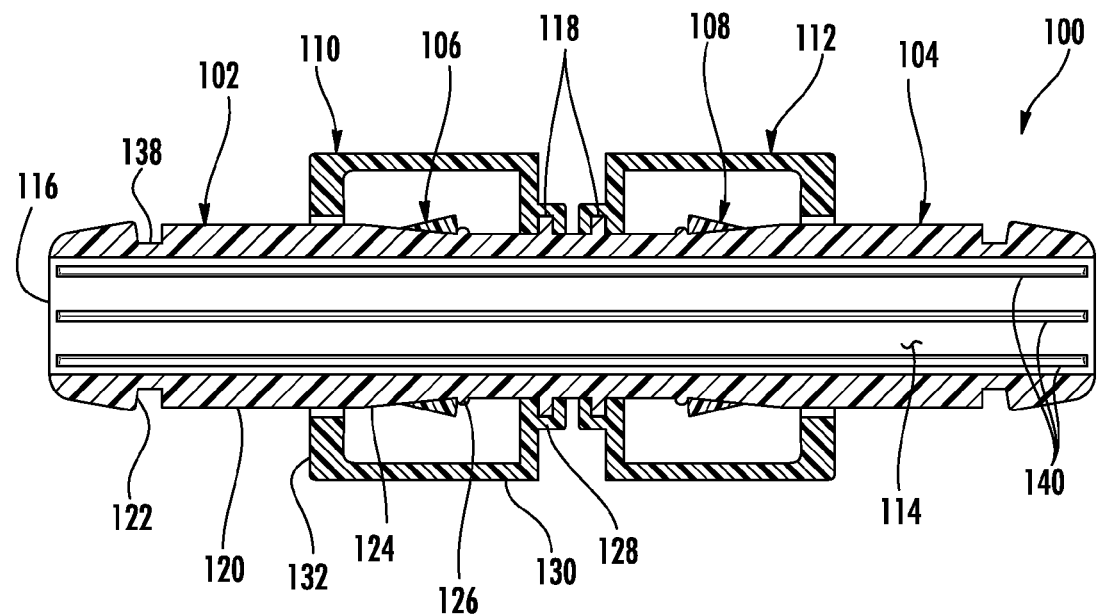
FIG. 2 is a vertical sectional view of the fitting of FIG. 1, showing the fitting insert and sleeve configuration, and an interior passageway through the fitting.

With additional reference to FIG. 2, an interior passage 114 (or channel) is centrally defined generally through the first and second insert members 102 and 104 for allowing fluid to flow through the interior passage 114 and through the fitting 100. The illustrated interior passage 114 extends completely through the fitting 100 to thereby allow the fluid to flow through the fitting 100 and between pipes interconnected by the fitting 100 (e.g., connected to the respective first and second insert members 102 and 104 of the fitting 100, etc.).

The first insert member 102, the first sleeve 106, and the first seal channel 122 and collar 110 of the illustrated fitting 100 will be described next, with it understood that a description of the second insert member 104, the second sleeve 108, and the second seal channel 134 and collar 112 of the illustrated fitting 100 is substantially the same.

With additional reference now to FIG. 2, the first insert member 102 of the illustrated fitting 100 generally includes an open end portion 116, a flange 118, and a body 120 disposed generally between the open end portion 116 and the flange 118. At the open end portion 116, the illustrated first insert member 102 is configured (e.g., tapered, rounded, etc. in shape) for facilitating movement of the insert member 102 into an end portion of a pipe when the fitting 100 is to be connected to the pipe, such that the first insert member 102 can be received at least partly within the end portion of the pipe. The first insert's open end portion 116 may be shaped differently than illustrated and/or described herein for facilitating movement of the insert member into the end portion of the pipe within the scope of the disclosure. For example, an insert member may include a step-shaped open end portion, a squared-off open end portion, etc. within the scope of the disclosure.

A peripheral or annular channel 122 is located adjacent the open end portion 116 of the first insert member 102 for receiving a sealing member (e.g., an O-ring, a gasket, etc.) (not shown) over the insert member 102. The channel 122 extends around a periphery of the first insert member 102 and is configured for receiving the sealing member into a seated position within the channel 122. The sealing member is configured to engage (e.g., compressively engage, sealingly engage, etc.) an inner surface of an end portion of a pipe when the fitting 100 is connected to the end portion of the pipe. This helps seal the pipe against the fitting 100 to help inhibit fluid from leaving, leaking from, etc. the end portion of the pipe at the fitting 100. As will be described in more detail hereafter, this also helps to further facilitate retention of the fitting 100 upon the pipe (e.g., as by frictionally engaging the pipe, etc.). While in the illustrated fitting 100 the sealing member is received within the channel 122 of the first insert member 102, in other example embodiments sealing members may be integrally, or monolithically, molded or formed with insert members. And in still further example embodiments, fittings may include no sealing members, or alternatively may include two or more sealing members.

As shown in FIGS. 1 and 2, the body 120 of the first insert member 102 includes a ramp section 124, defined generally around the body 120 of the first insert member 102 (e.g., generally concentrically formed around the body 120, etc.) and extending longitudinally along the body 120. A lip 126 is defined around the body 120, generally between the ramp section 124 and the first insert member's flange 118. The lip 126 operates to restrict rearward movement of the first sleeve 106 along the body 120 to help position the first sleeve 106 within an end portion of a pipe, which will be described in more detail hereinafter. The illustrated ramp section 124 generally slopes away from the open end portion 116 of the first insert member 102 and toward the lip 126 such that an outer diameter of the ramp section 124 generally decreases in dimension when moving along the ramp section 124 away from the open end portion 116 and toward the lip 126.

Figure 3A:
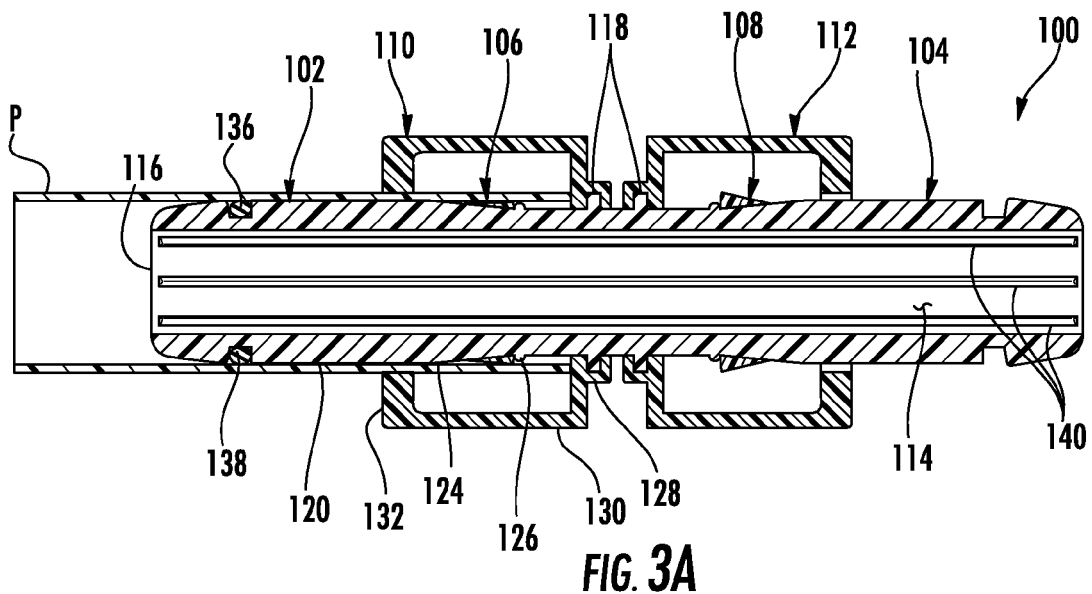
FIG. 3A is a vertical sectional view of the fitting of FIG. 1, showing the fitting being connected to the end portion of a pipe.
Figure 3B:
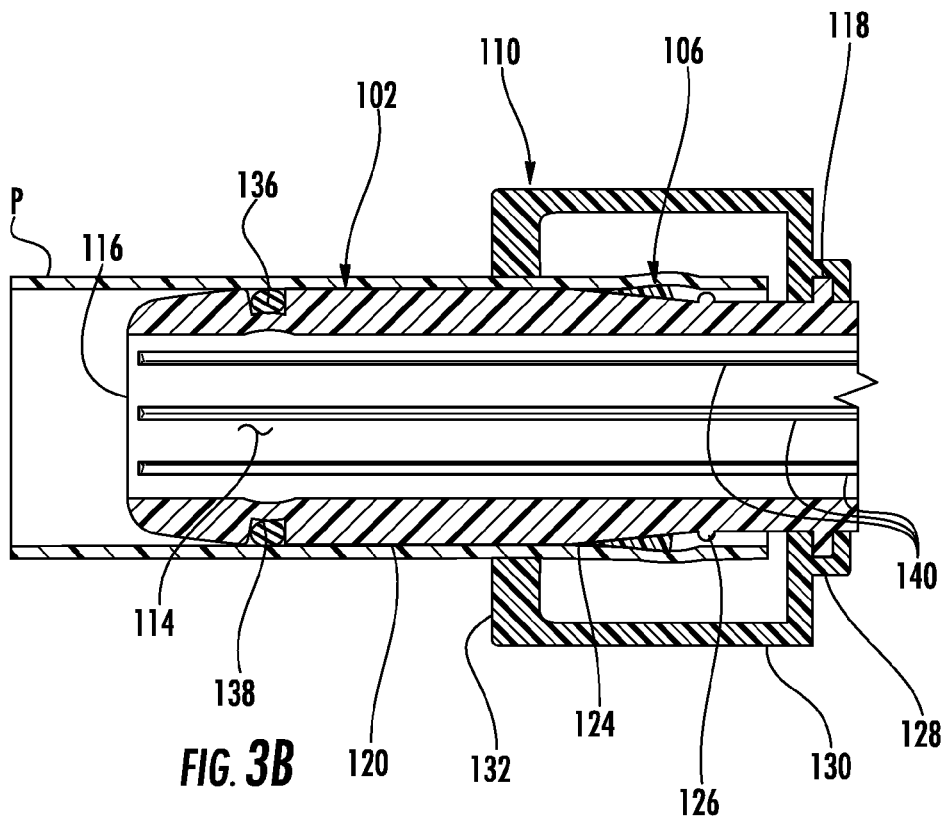
FIG. 3B is a vertical sectional view of the fitting of FIG. 1, showing the fitting being retained by retention members on the end portion of a pipe under fluid pressure.

The first sleeve 106 couples to the first insert member 102 generally along the ramp section 124 of the first insert member's body 120. The illustrated first sleeve 106 includes a continuous ring that is configured to fit around the ramp section 124 of the body 120. As shown in FIGS. 3A and 3B, in use, the first sleeve 106 is configured (e.g., sized, shaped, constructed, etc.) to receive at least part of an end portion of a pipe "P" over the sleeve 106 when the fitting 100 is connected to the end portion of the pipe.

As will be described in more detail hereinafter, the first sleeve 106 can move (e.g., slide, etc.) along the ramp section 124 for help in installing and/or retaining the fitting 100 on an end portion of a pipe. For example, the first sleeve 106 can move along the ramp section 124 between a generally forward position and a generally rearward position. In the rearward position, the first sleeve 106 is in a generally relaxed (e.g., un-expanded, etc.) position and is located generally adjacent the body's lip 126. And as previously stated, the lip 126 operates to restrict rearward movement of the first sleeve 106 along the ramp section 124 (which may help position the first sleeve 106 within the end portion of the pipe). In the forward position, the sleeve is located generally away from the body's lip 126 and toward the first insert member's open end portion 116. In this position, the sleeve may be expanded (broadly, deformed) in shape as it is located along the larger outer diameter portion of the ramp section.

And, as shown in FIG. 3A, it should be appreciated that the ramp section 124 may help with positioning the first sleeve 106 at least partly within an end portion of a pipe when connecting the fitting 100 to the end portion of the pipe. For example, the first sleeve 106 can be positioned along the ramp section 124 toward the lip 126, where the outer diameter of the ramp section 124 is generally smaller, so that the first sleeve 106 is in the generally relaxed (e.g., un-expanded, etc.) state to help facilitate movement of the end portion of the pipe over the first sleeve 106. Similarly, the ramp section 124 may help with retaining the end portion of the pipe in connection with the fitting 100. For example, the first sleeve 106 tends to slide along the ramp section 124 toward the portion of the ramp section 124 where the outer diameter is generally larger when the end portion of the pipe is moved in a direction tending to disconnect it from the fitting 100. This causes the first sleeve 106 to expand and thereby impart an increased force against an inner surface of the end portion of the pipe to help resist such movement of the end portion of the pipe.

As noted above and shown further in FIGS. 3A and 3B, it will be appreciated that channel 122 of the insert member 102 and sealing member 136 are also configured in such manner as to cause the sealing member 136 to function as an additional retention member for retaining the fitting 100 on the end portion of the pipe. When connecting the fitting 100 to the end portion of a pipe, sealing member 136 seats within channel 122 in compressive engagement with the inner wall of pipe "P." In addition to the above, however, it can be seen that the radial wall thickness of the insert member 102 at the seat 138 of channel 122 is reduced relative to the remainder of the insert member 102 (at least those portions immediately adjacent either side of channel 122). Consequently, as shown in FIG. 3B, upon increasing the fluid pressure within the pipe, and consequently within passageway 114 of the insert member 102, the thinned wall section 138 of channel 122 is caused to flex radially outward relative to insert member 102, thereby imparting an increased radial force through the sealing member 136 to the inner wall of the pipe "P." This increased radial force provides an increasing frictional resistance against separation of the pipe and fitting 100 in response to increasing internal fluid pressure within the piping system. Consequently, upon increasing fluid pressure in the pipe, retention of the fitting 100 on the pipe is further facilitated through the operable interaction of the sealing member 136 and channel 122 of the insert member 102.

Of course, for proper function, it is important that the wall thickness at seat 138 of channel 122 not be too great or too little relative to the remainder of the insert member 102. If the radial wall thickness at seat 138 is too great, insufficient flexing will occur to apply any appreciable retention force against the inner wall of pipe "P" through sealing member 136. On the other hand, too little wall thickness at seat 138 can result in too much flexing, thus causing a weakening of the wall at this point and possible breakage and rupturing thereof. The relative ratio between the wall thickness at seat 138 of channel 122 and the remainder of the insert member (or at least those portions immediately adjacent either side of channel 122) may vary depending on the material from which the insert member is constructed. However, for most plastic materials, a wall thickness at seat 138 in the approximate range of 48% to 61% the wall thickness of those portions of the insert member adjacent thereto has been found preferable for optimal performance. With an insert member formed of acrylonitrile butadiene styrene (ABS), the preferred percentage of such wall thickness has been found to be about 58%.

While the thinner wall section at seat 138 adds desirable flexibility to the wall structure of insert member 102 at such point, such thinning in this area, as well as along ramp section 124, could have the tendency to weaken the insert member 102 in these areas. In order to compensate for such potential weakness in the wall structure, as shown best in FIGS. 2, 3A and 3B, a plurality of strengthening ribs 140 may be formed on the inside surface of the insert member 102, extending longitudinally with the inner passageway 114. Such ribs 140 are relatively thin in cross section, but may be configured with a broader cross-sectional configuration without departing from the invention herein. Also, such ribs 140 may extend substantially the entire length of insert member 102, or may be located at one or more regular or intermittent intervals (and/or in different orientations) between opposite ends thereof, adjacent those areas requiring reinforcement. With such internal ribs 140, the overall strength of the insert member 102 is increased while simultaneously accommodating the desired flexibility to permit the wall structure at seat 138 to flex in the manner desired in reaction to an increase in internal fluid pressure within the piping system.

As noted above, it will be further appreciated that the added retention capability of seal 136 is due not only to the specific design of the insert member 102, but also the materials of construction used in the formation of the insert member 102 and seal 136. Specifically, it will first be appreciated that in most modern-day underground irrigation systems, the pipe utilized is generally constructed of a relatively flexible plastic material, such as Polyethylene (PE), which is relatively inexpensive, yet highly durable, flexible and resilient. Pipe fittings for use underground are also commonly constructed of a durable, flexible and resilient plastic material, albeit of a generally more rigid material, such as acrylonitrile butadiene styrene (ABS).

Other possible plastic materials that are contemplated for use in forming pipe fittings of this nature may be nylon, styrene, polyvinyl siloxane (PVS), polyvinyl chloride (PVC), etc. However, it should be appreciated that when connecting such fittings and pipe in the field during installation, rather significant angular and/or transverse forces may be exerted at the joint between the fitting and the pipe. More brittle plastics may have a propensity to crack and fail under such circumstances, particularly at the thinner regions of insert member 102. Consequently, it is generally preferred that the material used for the fittings be relatively flexible and resilient, with low water absorption characteristics, high durability and low cost. The use of other non-plastic fitting materials is also possible, but in the present application, for optimum performance of the seal retention function, it is preferred that at least the insert member 102 be constructed of a durable, flexible and resilient plastic material throughout. Consequently, in the present case, it is contemplated that the fitting 100 (or at least insert member 102) be preferably constructed of ABS, as ABS is typically more flexible and less prone to cracking than some other plastic materials, such as PVC.

The seal 136 is preferably constructed of an elastomeric material, such as a high grade EPDM (ethylene propylene diene monomer) rubber. With the use of such an elastomeric seal in conjunction with the relatively flexible, resilient plastic material of the insert member 102, it has been found, somewhat surprisingly, that the fitting 100 not only assembles with relative ease, but also exhibits superior pipe sealing and retention characteristics. Through testing, it has been found that the fitting 100 can be installed upon the end portion of a flexible PE pipe (e.g., 1.0 inch dia.) with relative ease by simply pushing it by hand, applying about 46 lbs. of pressure. Compare this to conventional barbed-typed fittings, as described above, which require about 126 lbs. applied pressure to assemble in like circumstances. Even more significantly, however, using an insert member 102 configured as described above, with an elastomeric seal 136 and retention sleeve 106, it has been found that the pipe can be pressurized internally to approximately 370-425 psi without the fitting 100 ever leaking or becoming dislodged. In tests conducted, the flexible PE pipe (which is typically rated for a maximum of only 80-100 psi working pressure) actually failed before the fitting 100 ever became dislodged.

The use of such an elastomeric material in the present application, and the benefits derived therefrom, are surprising in that the use of elastomeric materials are more typically found in applications for effectuating seals between highly rigid, moveable or immoveable structures, such as pistons, etc., made of metal. It was actually quite surprising to find that the use of such an elastomeric material in the present application involving pipe and fittings constructed of relatively flexible, resilient materials would yield the sealing and retention results obtained.

With further reference to FIGS. 1-3B, it can be seen that the first collar 110 couples to the first insert member 102 at the flange 118 of the first insert member 102 (toward a rearward portion of the body 120 of the first insert member 102, and generally adjacent where the first and second insert members 102 and 104 are coupled). The illustrated first collar 110 generally includes a clip 128 configured to frictionally fit over the flange 118 for coupling the first collar 110 to the first insert member 102. A pair of support arms (each indicated at 130) extend away from the clip 128 and support a ring 132 generally concentrically around the body 120 of the first insert member 102. The first collar 110 is configured (e.g., sized, shaped, constructed, etc.) to receive a pipe within the collar 110 when the fitting 100 is connected to an end portion of a pipe (and when the first insert member 102 is positioned within the end portion of the pipe). The first collar 110 may help with aligning the end portion of the pipe over the first insert member 102 when connecting the fitting 100 to the end portion of the pipe. The first collar 110 may also help resist bending movement of the pipe, and/or it may help compress the end portion of the pipe on the fitting 100 (e.g., against the first insert member 102, etc.) to help retain the end portion of the pipe on the fitting 100 against forces tending to move the end portion of the pipe off the fitting 100, etc. Collars may connect differently to insert members within the scope of the present disclosure.

The illustrated first collar 110 is generally open in structure such that the first insert member 102 is visible through the collar 110 (e.g., FIG. 1, etc.). This can allow for indication of proper insertion of the fitting 100 into an end portion of a pipe (e.g., for indication that the first insert member 102 is inserted a sufficient distance into the end portion of the pipe). For example, when the fitting 100 is properly connected to the end portion of the pipe, at least part of the end portion of the pipe may be adjacent the flange 118 (and may abut the flange 118 to help seal the pipe against the fitting 100 and to help inhibit fluid from leaving, leaking from, etc. the pipe at the fitting 100). This proper positioning can be facilitated by viewing movement of the end portion of the pipe onto the fitting 100 through the open structure of the first collar 110. In other example embodiments, collars may include generally solid structures extending around insert members of fittings, with one or more openings located in the collars for indicating proper positioning of the fittings on end portions of pipes.

An example process for connecting the fitting 100 to an end portion of a pipe will now be described. The process will be described with reference again to the first insert member 102, the first sleeve 106, and the first collar 110 with it understood that the process would be substantially the same for connecting the fitting 100 to a pipe at the second insert member 104, the second sleeve 108, and the second collar 112.

When desired to connect the fitting 100 to an end portion of a pipe, as shown in FIG. 3A, the end portion of the pipe "P" is slid over the open end portion 116 of the first insert member 102 (e.g., via a positive force, pressure, etc. moving the pipe over the first insert member 102, etc.), over the sealing member 136 seated within channel 122 of the first insert member 102, and into the first collar 110 (which may help align the pipe over the insert member). As the end portion of the pipe continues to move over the first insert member 102, it engages the first sleeve 106. At this point, if the first sleeve 106 is in the forward position along the body's ramp section 124, the end portion of the pipe will push the first sleeve 106 rearwardly along the ramp section 124 toward its rearward position.

Here, the first sleeve 106 engages the body's lip 126 which resists further rearward movement of the first sleeve 106. As further shown in FIG. 3A, the end portion of the pipe then moves over the first sleeve 106 such that the first sleeve 106 moves into the end portion of the pipe (the first sleeve 106 may also frictionally engage an inner surface of the end portion of the pipe). The end portion of the pipe may continue to move over the first insert member 102 (and first sleeve 106) until it is adjacent the first insert member's flange 118. In this position, the end portion of the pipe may also engage, abut, etc. the flange 118 such that further movement of the end portion of the pipe over the first insert member 102 is resisted by the flange 118. The fitting 100 is now connected to the end portion of the pipe.

As best shown in FIG. 3B, once the fitting 100 is connected to the end portion of the pipe, if force is applied to the fitting 100 and/or pipe tending to separate the fitting 100 and the pipe (e.g., a force pulling the fitting 100 out of the end portion of the pipe, a negative pressure tending to move the end portion of the pipe off of the fitting 100, etc.), the first sleeve 106, which may be frictionally engaged with the inside surface of the pipe, initially moves with the pipe in a generally forward direction along the ramp section 124 (i.e., in a direction tending to move the pipe off the fitting 100). The increasing outer diameter of the ramp section 124 expands the first sleeve 106 and causes the first sleeve 106 to apply an increasing pressure to the inside surface of the pipe. This increasing pressure tends to increase the frictional forces, pressure, etc. between the first sleeve 106 and the inside surface of the pipe for providing increased forces to help hold the end portion of the pipe on the fitting 100. This increasing pressure may also expand the end portion of the pipe, causing it to engage the first collar 110 (e.g., generally at the ring 132 of the first collar 110, etc.). The first collar 110 is constructed (e.g., rigidly constructed, etc.) to resist this expansion of the pipe and thus may help limit further movement of the end portion of the pipe and first sleeve 106 forward along the ramp section 124 (e.g., via frictional forces between an outer surface of the end portion of the pipe and the first collar 110, etc.). In the illustrated embodiment, the first sleeve 106 and first collar 110 can thus operate together to help retain the fitting 100 in place on the end portion of the pipe (e.g., under squeezing pressure between the first collar 110 and the first sleeve 106, etc.).

Furthermore, as fluid pressure within the pipe increases, the pressure within passageway 114 of the insert member 102 also increases, thereby causing the thinned wall section 138 of channel 122 is to flex radially outward relative to insert member 102. This, in turn, will impart an increased radial force through the sealing member 136 to the inner walls of the pipe "P." This increased radial force also provides an increasing frictional resistance against separation of the pipe and fitting 100 in response to increasing internal fluid pressure within the piping system. Consequently, as previously noted, upon increasing fluid pressure in the pipe, retention of the fitting 100 on the pipe is further facilitated through the operable interaction of the sealing member 136 and channel 122 of the insert member 102.

It should be appreciated that, in other example embodiments, fittings may include collars having sealing members dimensioned and configured to engage outer surfaces of pipes to which the fittings are connected for helping seal the pipes at the fittings. And, in further example embodiments, fittings may include sealing members dimensioned and configured to engage both inner surfaces of pipes and outer surfaces of pipes to which the fittings are connected for helping seal and retain the pipes to the fittings.

Figure 4:
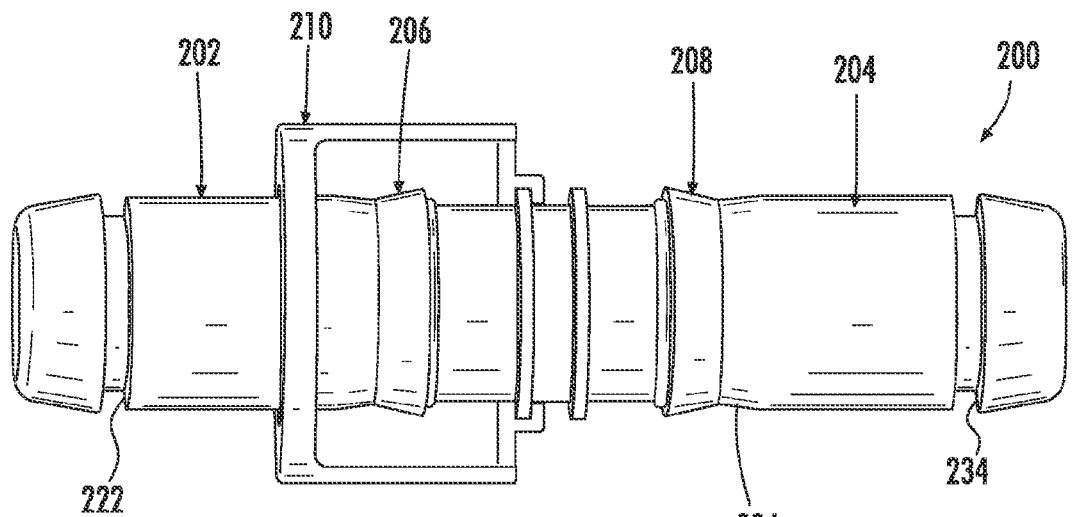
FIG. 4 is a side elevation view of another example embodiment of a fitting connectable to end portions of pipes, for example, for connecting two pipes together.

FIG. 4 illustrates another example embodiment of a fitting 200 connectable to end portions of pipes (not shown), for example, for connecting two pipes together. The fitting 200 of this embodiment is similar to the fitting 100 previously discussed and illustrated in FIGS. 1-3B. For example, the fitting 200 includes first and second insert members 202 and 204 and first and second sleeves 206 and 208 each for use in connecting the fitting 200 to an individual pipe and interconnecting the two individual pipes. The fitting 200 also includes channels 222 and 234 each for use in receiving a sealing member (not shown) to facilitate sealing of the insert members 202 and 204 against the inner pipe walls and further retention of the fitting 200 thereto in a manner similar to that previously discussed and illustrated in FIGS. 1-3B. In this embodiment, the fitting 200 includes a first collar 210 operable with the first insert member 202 and first sleeve 206 to help retain the fitting 200 on an end portion of a pipe substantially as disclosed herein, for example, with regard to the fitting 100 illustrated in FIGS. 1-3B, etc. A second collar is not included in this embodiment. The second insert member 204 and second sleeve 208 are configured to retain the fitting 200 on a pipe without use of a collar.

For example, in this embodiment the second sleeve 208 may include additional structure such as, for example, barbs, teeth, wedges, etc. configured to engage an inside surface of the pipe when the pipe is positioned over the sleeve. If force is applied to the fitting 200 and/or pipe tending to separate the fitting 200 and the pipe (e.g., a force pulling the fitting 200 out of the end portion of the pipe, etc.), this structure of the sleeve engages and/or pierces an inside surface of the pipe to resist the relative movement of the pipe and fitting 200. The second sleeve 208 may or may not move with the pipe forward relative to the second insert member 204 in this embodiment when force is applied tending to separate the fitting 200 and pipe (e.g., the second sleeve 208 may or may not be moveable relative to the second insert member 204, etc.). The sealing member contained within channel 234 will further help to seal and retain the second insert member 204 to the inner wall of the pipe within which it is received in a manner similar to that previously discussed and illustrated in FIGS. 1-3B.

In addition, it should be appreciated that a second collar may not be necessary if the second insert member 204 and second sleeve 208 are used to connect the fitting 200 to a substantially rigid pipe. Here, if force is applied to the fitting 200 and/or pipe tending to separate the fitting 200 and the pipe (e.g., a force pulling the fitting 200 out of the end portion of the pipe, etc.), the second sleeve 208 (which may be frictionally engaged with an inside surface of the end portion of the pipe following connection of the fitting 200 to the pipe) would initially move with the pipe forward along a ramp section 224 of the second insert member 204. Here, an increasing outer diameter of the ramp section 224 would expand the second sleeve 208 and cause the second sleeve 208 to apply an increasing pressure to the inside surface of the end portion of the pipe. However, the rigid pipe (described in this example) would resist this increasing pressure such that frictional contact would increase between the second sleeve 208 and the end portion of the pipe and limit any further movement of the pipe and sleeve forward along the ramp section 224 (it should also be appreciated that the second sleeve 208 may include teeth, etc. for piercing the rigid pipe and thereby helping retain the rigid pipe connected to the fitting 200).

Furthermore, a second collar may not be necessary when utilizing the fitting 200 as an expandable repair device, etc.

Figure 5:
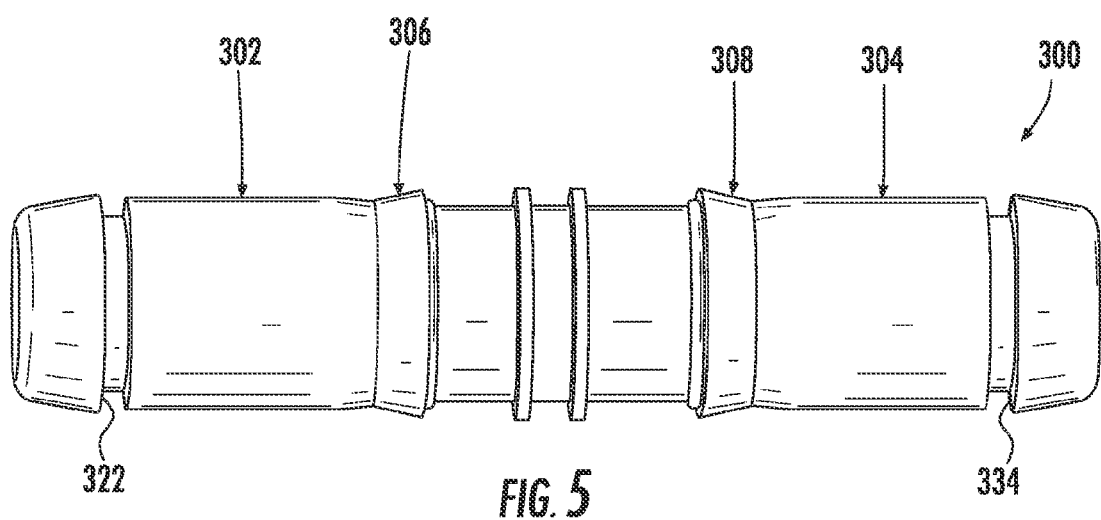
FIG. 5 is a side elevation view of still another example embodiment of a fitting connectable to end portions of pipes, for example, for connecting two pipes together.

FIG. 5 illustrates another example embodiment of a fitting 300 connectable to end portions of pipes (not shown), for example, for connecting two pipes together. The fitting 300 of this embodiment is similar to the fitting 200 previously discussed and illustrated in FIG. 4. For example, the fitting 300 includes first and second insert members 302 and 304 and first and second sleeves 306 and 308 each for use in connecting the fitting 300 to an individual pipe and interconnecting the two individual pipes. The fitting 300 also includes channels 322 and 334 each for use in receiving a sealing member (not shown) to facilitate sealing of the insert members 302 and 304 against the inner pipe walls and further retention of the fitting 300 thereto in a manner similar to that previously discussed and illustrated in FIG. 4. In this embodiment, first and second collars are not included. Here, the first and second insert members 302 and 304 and first and second sleeves 306 and 308 are configured to retain the fitting 300 on a pipe without use of collars.

Figure 6:
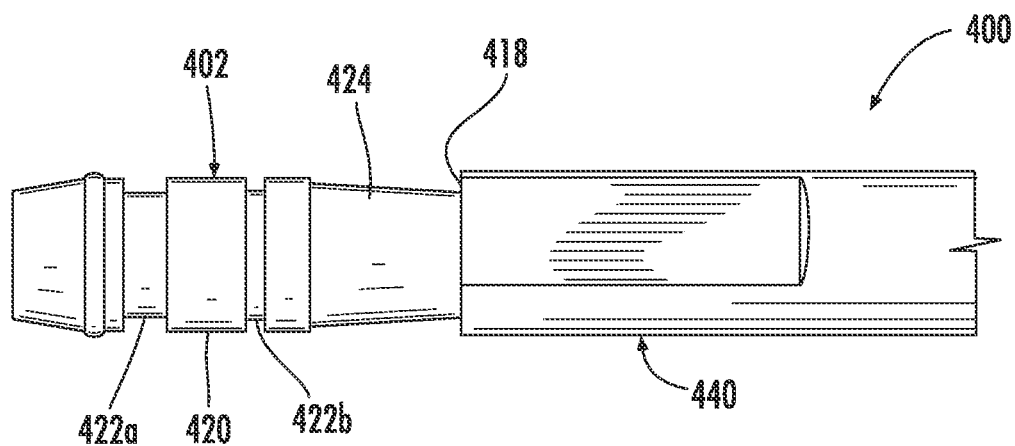
FIG. 6 is a side elevation view of another example embodiment of a fitting connectable to an end portion of a pipe.
Figure 7:
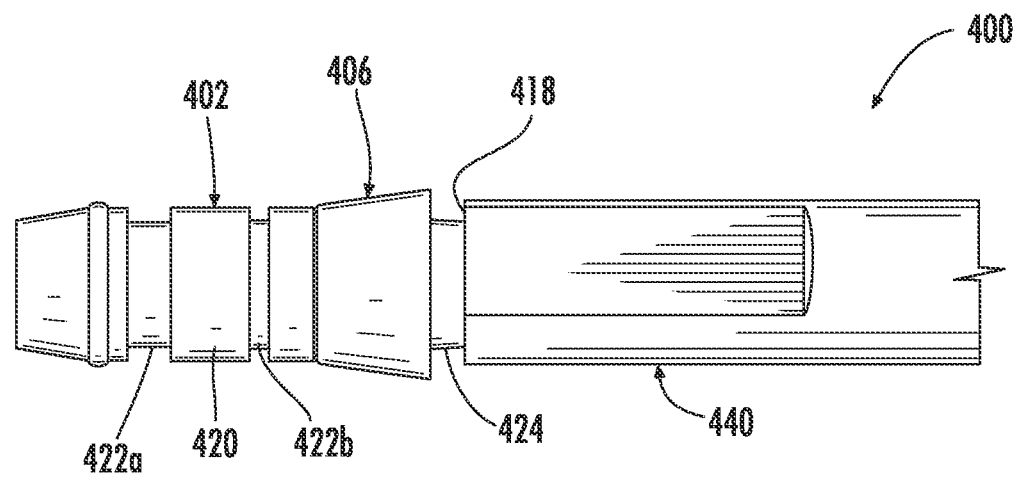
FIG. 7 is the side elevation view of FIG. 6, with a sleeve shown coupled to an insert member of the fitting and in a generally forward position along a ramp section of the insert member.
Figure 8:
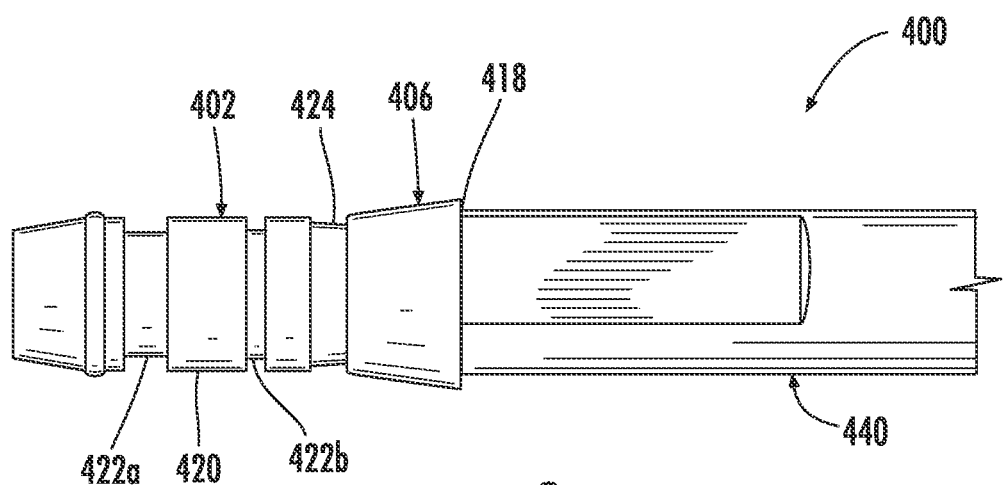
FIG. 8 is the side elevation view of FIG. 7, with the sleeve shown in a generally rearward position along the ramp section of the insert member.
Figure 9:
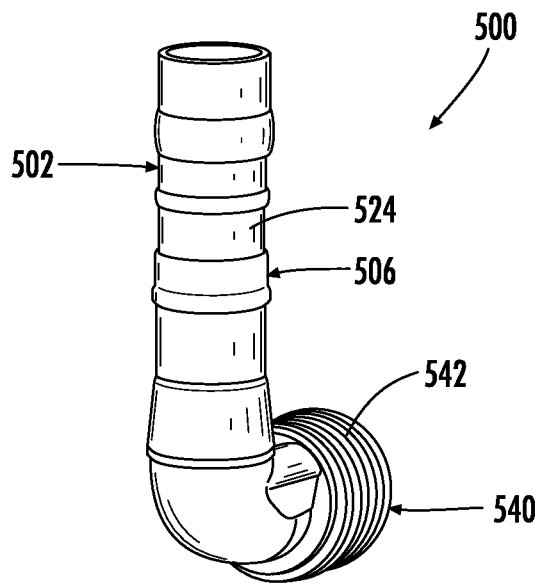
FIG. 9 is a perspective view of another example embodiment of a fitting connectable to end portions of pipes, for example, for connecting two pipes together.
Figure 10:
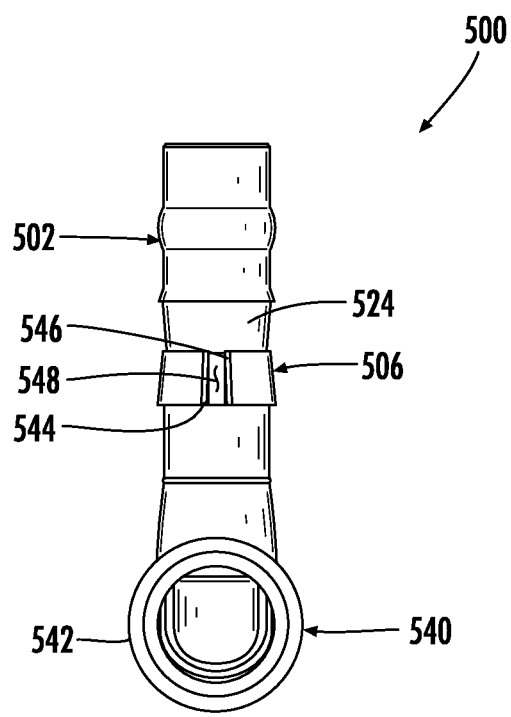
FIG. 10 is a side elevation view of the fitting of FIG. 9.
Figure 11:
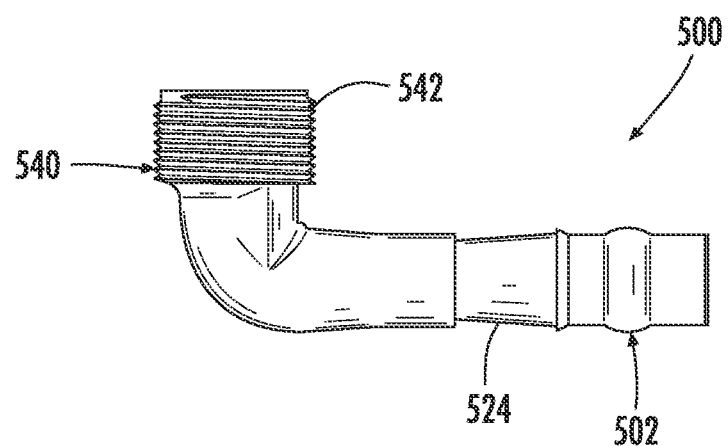
FIG. 11 is a side elevation view of the fitting of FIG. 9, with a sleeve of the fitting removed.

FIGS. 6-8 illustrate still another example embodiment of a fitting 400 connectable to an end portion of a pipe (not shown). The drawings illustrate a first end portion (to the left in FIGS. 6-8) of a fitting 400 that includes an insert member 402 and a sleeve 406 (broadly, retention member) disposed along a ramp section 424 of a body 420 of the insert member 402. In FIG. 6, the sleeve 406 is shown removed from the fitting 400. In FIG. 7, the sleeve 406 is shown in a generally forward position, located generally toward the insert member 402 (e.g., in an expanded position for retaining the fitting 400 on an end portion of a pipe, etc.). And in FIG. 8, the sleeve 406 is shown in a generally rearward position adjacent a flange 418 of the insert member 402 (e.g., in a generally relaxed position of the sleeve 406 for allowing an end portion of a pipe to be moved over the sleeve 406, etc.).

In this embodiment, the insert member 402 includes first and second channels 422*a* and 422*b* each configured (e.g., sized, shaped, constructed, etc.) for receiving a sealing member (e.g., an O-ring, gaskets, etc.) (not shown) over the insert member 402. The first and second channels 422*a* and 422*b* each extend around a periphery of the insert member 402 and are each configured for receiving a respective sealing member (not shown) into a seated position within each of the respective channels 422*a* and 422*b*. Here, the two sealing members are each configured to engage (e.g., sealingly engage, compressively engage, etc.) an inner surface of an end portion of a pipe at spaced apart locations (e.g., 0.25 inches apart, etc.) when the fitting 400 is connected to the end portion of the pipe. The end portion of the pipe may tend to relax between the sealing members to help better seal the end portion of the pipe against the fitting 400 and help inhibit fluid from leaving, leaking from, etc. the end portion of the pipe at the fitting 400. As described in previous embodiments, the channels 422*a*, 422*b* and seals carried therein may also be configured to provide enhanced retention capabilities of the fitting 400 upon the pipe with increasing fluid pressure within the pipes.

Also in this embodiment, a second end portion 440 of the fitting 400 (to the right in FIGS. 6-8) may be constructed to any desired configuration (e.g., size, shape, construction, etc.). For example, the second end portion 440 of the fitting 400 may include a generally closed construction to terminate flow within a pipe installed to the fitting 400; may include a connection (e.g., as disclosed herein, etc.) to connect the fitting 400 to another pipe for interconnecting two pipes; etc. In addition, the fitting 400 may be used in combination with other fittings (e.g., as part of a T-fitting, an elbow fitting, etc. with the illustrated first end portion being formed as an integral, monolithic, etc. part of the fitting 400 and in combination with one or more other types of integral end portions suitable for connecting to one or more pipes; or for terminating flow within one or more pipes; etc.).

FIGS. 9-12 illustrate an example embodiment of an L-shaped fitting 500 for use in interconnecting two pipes (not shown) (e.g., a Polyurethane (PU) or Polyethylene (PE) pipe, and a threaded pipe, etc.). The fitting 500 of this embodiment is similar to the fitting 400 previously discussed and illustrated in FIGS. 6-8. A first end portion of the fitting 500 (toward the top of the fitting 500 illustrated in FIG. 9) includes an insert member 502 and a sleeve 506 disposed about a ramp section 524 of the insert member 502 for connecting the PE pipe to the fitting 500. Fitting 500 also may include a peripheral annular channel for carrying a seal/retention member in manner similar to previous embodiments (not shown). A second end portion 540 of the fitting 500 includes a threaded connection 542 for connecting the fitting 500 to a correspondingly threaded end portion of a second pipe.

Figure 12:
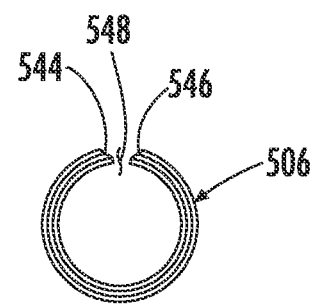
FIG. 12 is a top plan view of the sleeve of the fitting of FIG. 9.

As shown in FIG. 12, in this embodiment the sleeve 506 is generally C-shaped such that free end portions 544 and 546 of the sleeve 506 are separated by an opening 548. This shape allows the sleeve 506 to expand (i.e., allows the free end portions 544 and 546 to separate at the opening 548) when the sleeve 506 moves along the ramp section 524 of the insert member 502 (e.g., upwardly in FIG. 9 and in a direction of increasing outer diameter along of the ramp section 524, etc.).

For example, the first end portion of the fitting 500 may be connected to the PE pipe by sliding an end portion of the PE pipe over the insert member 502 and sleeve 506 (substantially as previously described herein). If force is applied to the fitting 500 and/or pipe tending to separate the fitting 500 and the pipe (e.g., a force pulling the fitting 500 out of the end portion of the PE pipe, etc.), the sleeve 506 (which may be frictionally engaged with an inside surface of the end portion of the PE pipe) initially moves with the pipe upwardly along the ramp section 524 of the insert member 502. The increasing outer diameter of the ramp section 524, however, expands the sleeve 506 (i.e., moves the end portions 544 and 546 of the sleeves apart at the opening 548) and causes the sleeve 506 to apply an increasing pressure to the inside surface of the end portion of the PE pipe. This pressure causes the sleeve 506 to frictionally engage, bite into, and/or pierce the end portion of the PE pipe and resist further relative movement of the PE pipe and fitting 500. This biting engagement between the sleeve 506 and end portion of the PE pipe results from the material characteristics of the PE pipe (e.g., flexibility, density, etc.). Thus, in this embodiment, a collar may not be necessary for helping connect and/or retain the fitting 500 to the end portion of the PE pipe.

Figure 13:
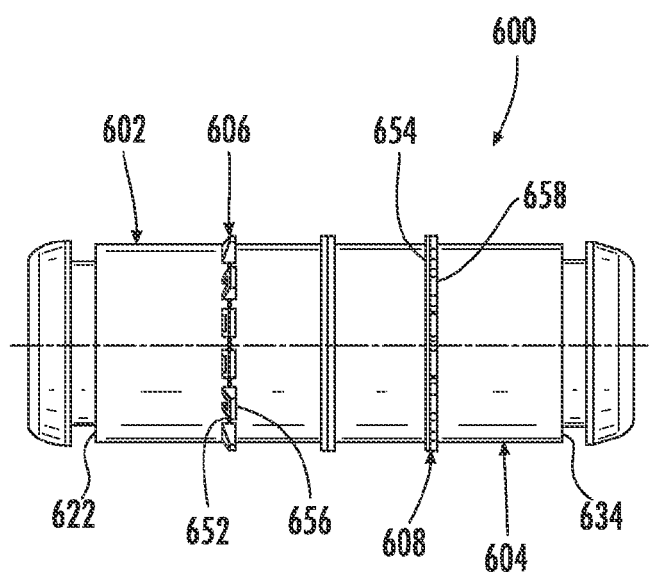
FIG. 13 is a side elevation view of another example embodiment of a fitting connectable to end portions of pipes, for example, for connecting two pipes together.
Figure 14:
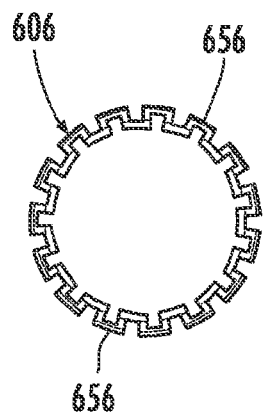
FIG. 14 is a top plan view of a first sleeve of the fitting of FIG. 13.
Figure 15:
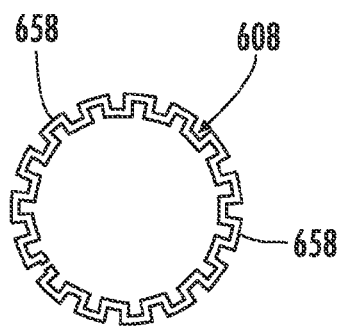
FIG. 15 is a top plan view of a second sleeve of the fitting of FIG. 13.

FIGS. 13-15 illustrate another example embodiment of a fitting 600 connectable to end portions of pipes (not shown), for example, for connecting two pipes together. The fitting 600 includes first and second insert members 602 and 604 (generally coupled together at respective flanges) and first and second sleeves 606 and 608 each for use in connecting the fitting 600 to an individual pipe and interconnecting the two individual pipes. In this embodiment, collars are not included. Here, the first and second insert members 602 and 604 and the first and second sleeves 606 and 608 are configured to retain the fitting 600 on a pipe without use of the collars. In addition, the first and second sleeves 606 and 608 are both coupled to the respective first and second insert members 602 and 604 such that they are not longitudinally moveable (e.g., slidable, etc.) relative to the insert members 602 and 604, and thus do not move with the pipes when the fitting 600 is inserted into end portions of the pipes or when forces are applied to the fitting 600 and/or pipes tending to move them apart. The illustrated first and second sleeves 606 and 608 are seated within respective grooves 652 and 654 extending generally around the first and second insert members 602 and 604. In other example embodiments, insert members may be formed integral, or monolithic, with the insert members (e.g., by molding, etc.).

In this embodiment, the first and second sleeves 606 and 608 include respective teeth 656 and 658 configured to engage, pierce, etc. inside surfaces of end portions of the pipes when the end portions of the pipes are positioned over the respective sleeves 606 and 608. The teeth 656 of the first sleeve 606 are angled slightly rearwardly of the first insert member 602 to promote engagement of the teeth 656 with the inside surface of the end portion of the pipe received over the first insert member 602. And, the teeth 658 of the second sleeve 608 are oriented generally perpendicular to the second insert member 604. In either case, if force is applied to the fitting 600 and/or pipes tending to separate the fitting 600 and the pipes (e.g., a force pulling the fitting 600 out of the end portions of the pipes, etc.), the teeth 656 and 658 of the sleeves 606 and 608 engage and/or pierce the inside surfaces of the pipes to resist relative movement of the pipes and fitting 600. In this embodiment, the first and second sleeves 606 and 608 do not move relative to the respective first and second insert members 602 and 604, and do not move with the end portions of the pipes forwardly along the insert members 602 and 604 when force is applied tending to separate the fitting 600 and the end portions of the pipes. One or more of the teeth 656 and/or 658 of the first and/or second sleeve 606 and/or 608 may be oriented differently than disclosed herein within the scope of the present disclosure.

Here again, as in previous embodiments described, fitting 600 may also be formed with first and second peripheral channels 622 and 624, each of which is adapted to carry a sealing member (not shown) for sealing against the inside surface of the end portion of a pipe within which it is inserted, and for providing additional retention of the pipe to the fitting 600 in a manner similar to that described in connection with previous embodiments. As fluid pressure within the piping system increases, the interior pressure within fitting 600 will also increase, thereby causing the thinner walls at channels 622 and 634 to flex radially outward relative to insert member 602. This, in turn, will impart an increased radial force through the sealing members to the inner walls of the pipe, thus providing an increased frictional resistance against separation of the pipe and fitting 600 in response to increasing internal fluid pressure within the piping system.

Figure 16:
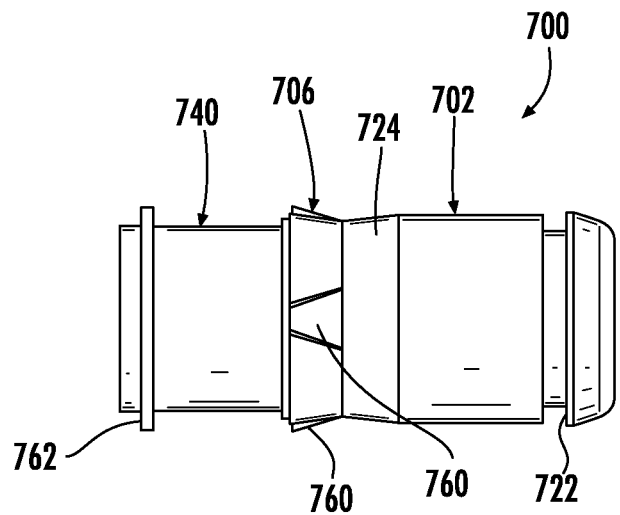
FIG. 16 is a side elevation view of another example embodiment of a fitting connectable to end portions of pipes, for example, for connecting two pipes together.
Figure 17:
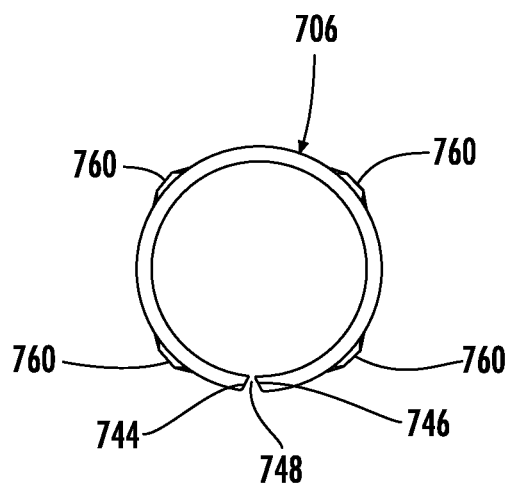
FIG. 17 is a top plan view of a sleeve of the fitting of FIG. 16.

FIGS. 16 and 17 illustrate still another example embodiment of a fitting 700 connectable to end portions of pipes (not shown). A first end portion of the fitting 700 includes an insert member 702 and a sleeve 706 disposed about a ramp section 724 of the insert member 702. The sleeve 706 is generally C-shaped such that free end portions 744 and 746 of the sleeve 706 are separated by an opening 748. This shape allows the sleeve 706 to expand (i.e., allows the free end portions 744 and 746 to separate at the opening 748) when the sleeve 706 moves along the ramp section 724 of the insert member 702 (e.g., in a direction of increasing outer diameter along of the ramp section 724, etc.) for helping retain the fitting 700 on an end portion of a pipe (against forces tending to separate the fitting 700 and the end portion of the pipe). The sleeve 706 also includes wedge-shaped protrusions 760 extending outward from the sleeve 706 for engaging an inside surface of the end portion of the pipe when the sleeve 706 expands.

In this embodiment, the first end portion of the fitting 700 may be connected to an end portion of a pipe by sliding the pipe over the insert member 702 and sleeve 706. Once connected, if force is applied to the fitting 700 and/or pipe tending to separate the fitting 700 and the pipe (e.g., a force pulling the fitting 700 out of the end portion of the pipe, etc.), the sleeve 706 (which may be frictionally engaged with an inside surface of the pipe) initially moves with the pipe forwardly along the ramp section 724 of the insert member 702 (substantially as previously described herein). The increasing outer diameter of the ramp section 724 expands the sleeve 706 (i.e., moves the end portions 744 and 746 of the sleeve 706 apart at the opening 748) and causes the protrusions 760 of the sleeve 706 to apply an increasing pressure to the inside surface of the end portion of the pipe. This pressure causes the protrusions 760 to engage and/or pierce the inner surface of the end portion of the pipe and help resist further relative movement of the end portion of the pipe and fitting 700. Thus, in this embodiment a collar may not be necessary for connecting the fitting 700 to the end portion of the pipe.

This end portion of the fitting 700 may also include an annular channel 722 for use in receiving a sealing member (not shown), as in previous embodiments. The operable interaction of channel 722 and the sealing member carried thereby facilitates sealing of the insert member 702 against the inside surface of the end portion of a pipe within which it is inserted, and provides additional resistance against fitting 700 becoming dislodged from the pipe due to increasing internal fluid pressure in the piping system, as previously discussed and illustrated herein.

A second end portion 740 of the fitting 700 (to the left in FIG. 16) includes a flange 762 for use in frictionally coupling an end portion of the pipe to the second end portion 740 of the fitting 700.

Figure 18:
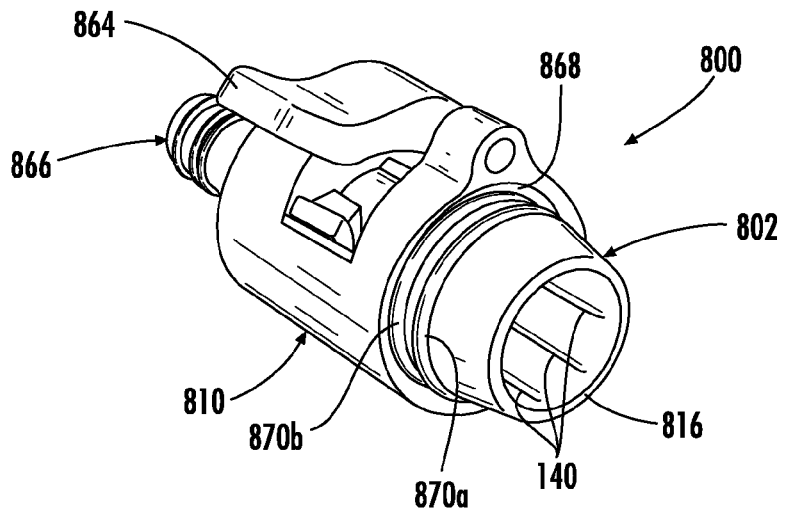
FIG. 18 is a perspective view of another example embodiment of a fitting connectable to end portions of pipes, for example, for connecting two pipes together.
Figure 19:
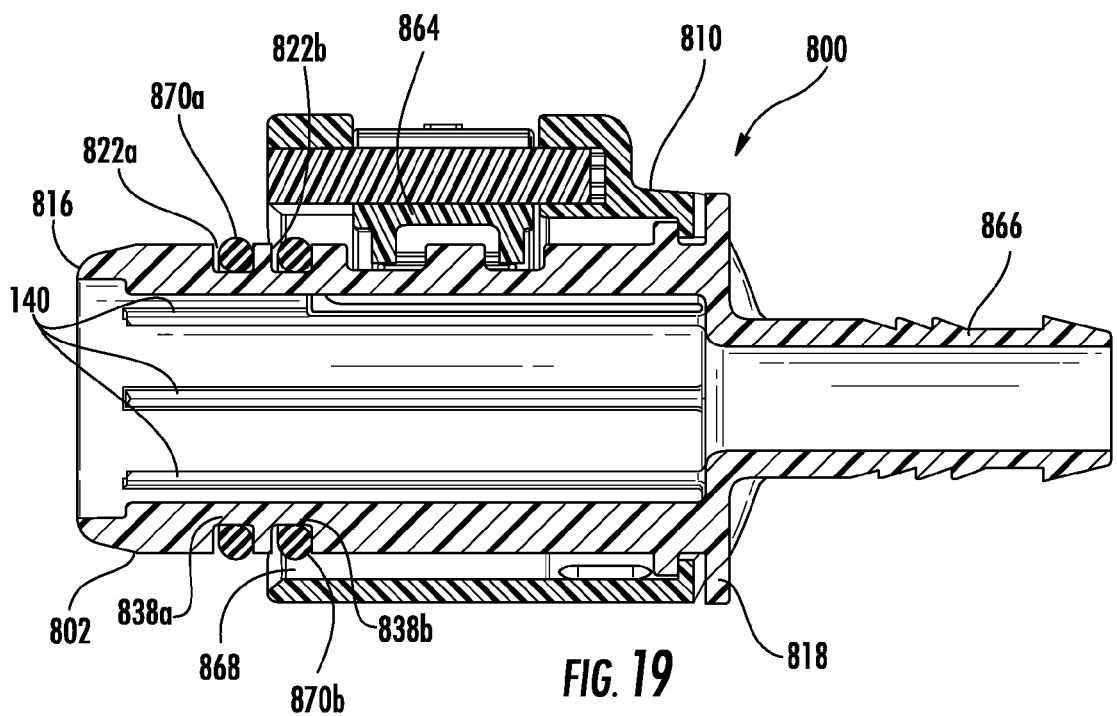
FIG. 19 is a vertical sectional view of the fitting of FIG. 18.

FIGS. 18 and 19 illustrate another example embodiment of a fitting 800 connectable to an end portion of a pipe, for example, for connecting two pipes together. The fitting 800 generally includes a housing 810 (e.g., a casing, etc.), an insert member 802, a lever 864 (broadly, a retention member), and a barbed connector 866 (to the right of the fitting 800 in FIG. 19). The housing 810 and insert member 802 are generally cylindrical in shape. And the insert member 802 is disposed at least partly within the housing 810, generally concentrically with the housing 810 such that the housing 810 and the insert member 802 may have a common longitudinal axis. In addition, a space 868 defined within the housing 810 between the housing 810 and the insert member 802 is generally uniform in width. The width of this space 868 may be about equal to a thickness of a wall of the pipe to which the fitting 800 is to be connected. A pipe wall may thus be received into the space 868 between the housing 810 and insert member 802 when the fitting 800 is connected to the pipe. The space 868 may be larger or smaller than a thickness of a wall of a pipe within the scope of the present disclosure. The housing 810 and insert member 802 may broadly be referred to as a body of the fitting 800. But a fitting body should not be interpreted to require both a housing and an insert member. In other example embodiments, for example, a fitting may include a body having only a housing or only an insert member. In addition, the fitting 800 could include more than one lever 864 within the scope of the present disclosure. For example, two or more levers could be coupled to the housing 810 of the fitting 800.

The insert member 802 connects to an end wall 818 of the housing 810 at a rearward, closed end of the housing 810. The end wall 818 of the housing 810 can also be viewed as defining a flange of the insert member 802. The insert member 802 extends forward from the end wall 818 and passes out of the housing 810 at a forward, open end portion of the housing 810 generally opposite the end wall 818 (FIG. 18). In the illustrated fitting 800, the insert member 802 and housing 810 are formed integrally, or monolithically, with the end wall 818 such that the insert member 802 is integral, or monolithic, with the housing 810. This may be accomplished by forming the housing 810 and insert member 802 from one piece of material using, for example, an acceptable molding process, other acceptable fabrication process, etc. In other example embodiments, fittings may include insert members formed separately from housings and attached thereto. In still other example embodiments, fittings may include insert members that are disposed substantially within housings such that the insert members do not pass out of the housings at forward ends of the housings.

As previously discussed, in most modern-day underground piping systems (e.g., irrigation, drainage, etc.), both the pipe and fittings utilized therewith are preferably constructed of a plastic material that is durable, flexible and resilient throughout. Since such systems are commonly used to transport water, it is also preferred that the material selected have low water absorption characteristics. In one example embodiment, the pipe utilized is constructed of Polyethylene (PE), which is relatively inexpensive, yet highly durable, flexible and resilient, and has low water absorption properties. The pipe fittings are also constructed of a durable, flexible and resilient plastic material, albeit of a generally more rigid material, such as acrylonitrile butadiene styrene (ABS). While the use of other plastic materials is also contemplated, such as nylon, styrene, polyvinyl siloxane (PVS), etc., the use of PE pipe and ABS fittings are common in the irrigation industry.

With further reference to fitting 800, it can be seen that a forward end portion 816 of the insert member 802 may be open, and is configured (e.g., tapered, rounded, etc. in shape) for facilitating movement of the insert member 802 into the end portion of the pipe when the fitting 800 is connected to the pipe. Channels or grooves 822a and 822b are formed around a periphery of the insert member 802 at its forward end for receiving sealing members 870a and 870b (e.g., O-rings, gaskets, etc.). The seals 870a and 870b are preferably constructed of an elastomeric material, such as a high grade EPDM (ethylene propylene diene Monomer) rubber. As described previously, with the use of such an elastomeric seal in conjunction with the relatively flexible, resilient plastic material of the insert member 802, it has been found that the fitting 800 actually exhibits superior pipe sealing and retention characteristics. The sealing members 870a and 870b provide a sealing connection between the insert member 802 (and the fitting 800) and a pipe through compressive engagement therewith. Moreover, channels 822a and 822b, and the respective seals 870a and 870b carried therein, interact to provide enhanced retention capability of fitting 800 to a pipe upon which it is connected when fluid pressure within the piping system increases.

In this embodiment, the radial wall thickness of the insert member 802 at the seats 838a and 838b of channels 822a and 822b, respectively, are reduced relative to the remainder of the insert member 802. Consequently, in a similar manner to that shown in previous embodiments, when the fluid pressure within the piping system increases, pressure within the insert member 802 also increases, thereby causing the thinned wall sections at points 838a and 838b to flex slightly outward radially relative to insert member 802. As a result, an increased radial force caused by the increasing internal pressure within the piping system is imparted through sealing members 870a and 870b to the inner surface of the end portion of a pipe within which insert member 802 has been received. This increased radial force provides an increasing frictional resistance against separation of the fitting 800 from the pipe to which it is connected. Consequently, upon increasing fluid pressure in the pipe, retention of the fitting 800 on the pipe is further facilitated through the operable interaction of the sealing members 870a, 870b and channels 822a, 822b of the insert member 802.

The lever 864 connects to the housing 810 for use in engaging the end portion of the pipe received over the insert member 802 and into the housing 810 to selectively connect the fitting 800 to the end portion of the pipe. The lever 864 is pivotable relative to the housing 810 and insert member 802 between an open position in which the fitting 800 may be installed to the end portion of the pipe and a clamped position (FIG. 19) in which the installed fitting 800 may be retained on (is secured to) the end portion of the pipe. In the open position, the lever 864 extends away from the insert member 802, providing room for a pipe to slide over the insert member 802 within the housing 810. In the clamped position, the lever 864 engages the end portion of the pipe present within the space 868 between the housing 810 and the insert member 802. And if force is applied to the fitting 800 and/or pipe tending to separate the fitting 800 and the pipe (e.g., a force pulling the fitting 800 out of the end portion of the pipe, etc.), the lever 864 engaging the pipe further helps to resist relative movement of the pipe and fitting 800 tending to separate the two.

The barbed connector 866 may be used, for example, for connecting the fitting 800 to an irrigation line (not shown). The irrigation line may be flexible and may be slid over the connector for fluidly linking (or connecting) the irrigation line to a pipe connected to the insert member 802 of the fitting 800. In other example embodiments, fittings may include housings with connectors shaped differently for fluidly linking one pipe to another pipe, fluid carrying line, etc. In still other example embodiments, fittings may include two or more housings, insert members, and sleeves for interconnecting two or more pipes. For example, a fitting may include three corresponding housings, insert members, and sleeves fluidly connected and oriented in a generally T-shape, Y-shape, etc. Each corresponding housing, insert member, and sleeve may be connected to an end portion of a pipe such that three different pipes may be fluidly connected to the fitting.

Figure 20:
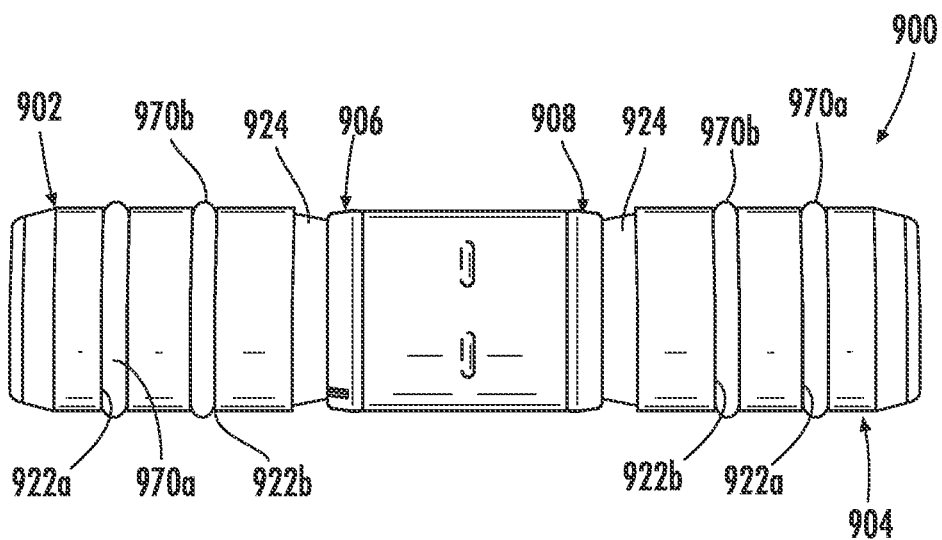
FIG. 20 is a side elevation view of another example embodiment of a fitting connectable to end portions of pipes, for example, for connecting two pipes together.

FIG. 20 illustrates another example embodiment of a fitting 900 connectable to end portions of pipes (not shown), for example, for connecting two pipes together and allowing fluid to flow through the fitting 900 between the two pipes. The illustrated fitting includes first and second insert members 902 and 904, and first and second sleeves 906 and 908 (broadly, retention member) disposed along ramp sections 924 of the respective insert members 902 and 904.

In this embodiment, the first and second insert members 902 and 904 each include first and second channels 922a and 922b configured (e.g., sized, shaped, constructed, etc.) for receiving respective sealing members 970a and 970b (e.g., an O-ring, gaskets, etc.) over the respective insert members 902 and 904. The first and second channels 922a and 922b extend around peripheries of the first and second insert members 902 and 904 and are configured for receiving the respective sealing members 970a and 970b into seated positions within the respective channels 922a and 922b. Each pair of the sealing members 970a and 970b are configured to engage (e.g., sealingly engage, compressively engage, etc.) an inner surface of an end portions of a pipe at spaced apart locations (e.g., 0.25 inches apart, etc.) when the fitting 900 is connected to the end portion of the pipe. The end portion of the pipe may tend to relax between the two sealing members 970a and 970b to help better seal the end portion of the pipe against the fitting 900 and help inhibit fluid from leaving, leaking from, etc. the end portion of the pipe at the fitting 900. As described in previous embodiments, the channels 922a, 922b and seals 970a, 970b carried therein may also be configured to provide enhanced retention capabilities of the fitting 900 upon a pipe with increasing fluid pressure within the piping system.

Figure 21:
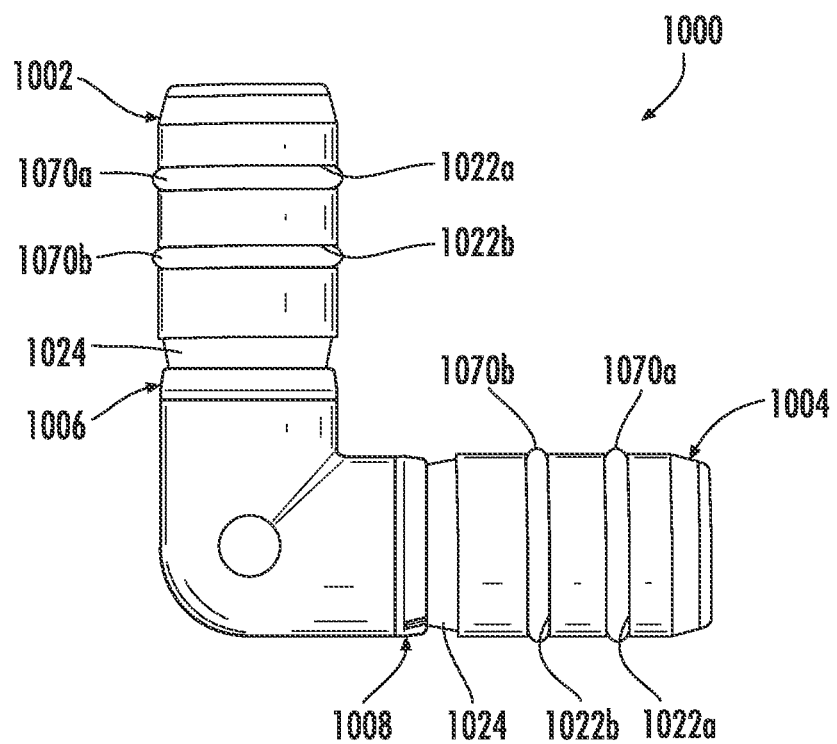
FIG. 21 is a side elevation view of another example embodiment of a fitting connectable to end portions of pipes, for example, for connecting two pipes together.

FIG. 21 illustrates another example embodiment of a fitting 1000 connectable to end portions of pipes (not shown), for example, for connecting two pipes together and allowing fluid to flow through the fitting 1000 between the two pipes. The illustrated fitting 1000 has an L-shape construction and includes first and second insert members 1002 and 1004, and first and second sleeves 1006 and 1008 (broadly, retention member) disposed along ramp sections 1024 of the respective insert members 1002 and 1004.

In this embodiment, the first and second insert members 1002 and 1004 each include first and second channels 1022a and 1022b configured (e.g., sized, shaped, constructed, etc.) for receiving respective sealing members 1070a and 1070b (e.g., an O-ring, gaskets, etc.) over the respective insert members 1002 and 1004. The first and second channels 1022a and 1022b extend around peripheries of the first and second insert members 1002 and 1004 and are configured for receiving the respective sealing members 1070a and 1070b into seated positions within the respective channels 1022a and 1022b. Each pair of the sealing members 1070a and 1070b are configured to engage (e.g., sealingly engage, compressively engage, etc.) an inner surface of an end portion of a pipe at spaced apart locations (e.g., 0.25 inches apart, etc.) when the fitting 1000 is connected to the end portion of the pipe. The end portion of the pipe may tend to relax between the two sealing members 1070a and 1070b to help better seal the end portion of the pipe against the fitting 1000 and help inhibit fluid from leaving, leaking from, etc. the end portion of the pipe at the fitting 1000. As described in previous embodiments, the channels 1022a, 1022b and seals 1070a, 1070b carried therein may also be configured to provide enhanced retention capabilities of the fitting 1000 upon a pipe with increasing fluid pressure within the piping system.

Figure 22:
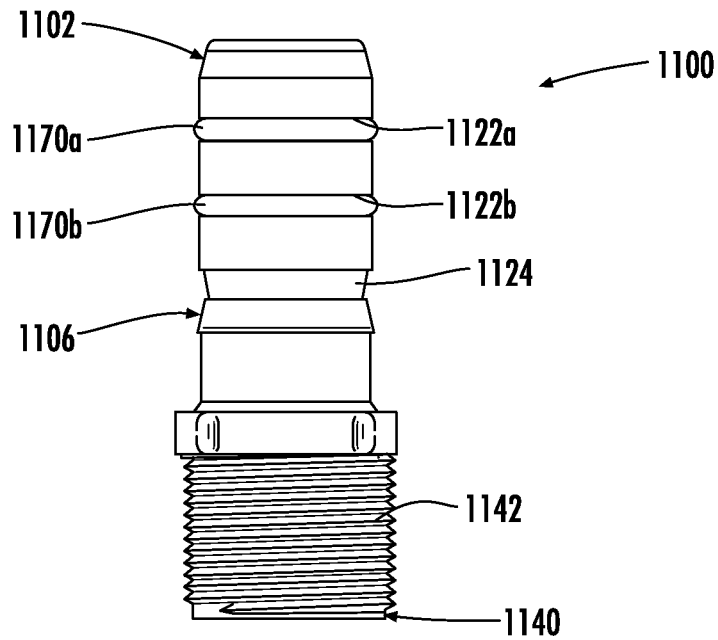
FIG. 22 is a side elevation view of another example embodiment of a fitting connectable to end portions of pipes, for example, for connecting two pipes together.

FIG. 22 illustrates another example embodiment of a fitting 1100 connectable to end portions of pipes (not shown), for example, for connecting two pipes together and allowing fluid to flow through the fitting 1100 between the two pipes. A first end portion of the fitting 1100 (toward the top of the fitting 1100 illustrated in FIG. 22) includes an insert member 1102 and a sleeve 1106 disposed about a ramp section 1124 of the insert member 1102 for connecting a first pipe to the fitting 1100. A second end portion 1140 of the fitting 1100 includes a threaded connection 1142 for connecting the fitting 1100 to a correspondingly threaded end portion of a second pipe.

In this embodiment, the insert member 1102 again includes first and second channels 1122a and 1122b configured (e.g., sized, shaped, constructed, etc.) for receiving respective sealing members 1170a and 1170b (e.g., an O-ring, gaskets, etc.) over the insert member 1102. The sealing members 1170a and 1170b are configured to engage (e.g., sealingly engage, compressively engage, etc.) an inner surface of an end portion of the first pipe at spaced apart locations (e.g., 0.25 inches apart, etc.) when the fitting 1100 is connected to the end portion of the first pipe. The end portion of the first pipe may tend to relax between the two sealing members 1170a and 1170b to help better seal the end portion of the first pipe against the fitting 1100 and help inhibit fluid from leaving, leaking from, etc. the end portion of the first pipe at the fitting 1100. As described in previous embodiments, the channels 1122a, 1122b and seals 1170a, 1170b carried therein may also be configured to provide enhanced retention capabilities of the fitting 1100 upon a pipe with increasing fluid pressure within the piping system.

Figure 23:
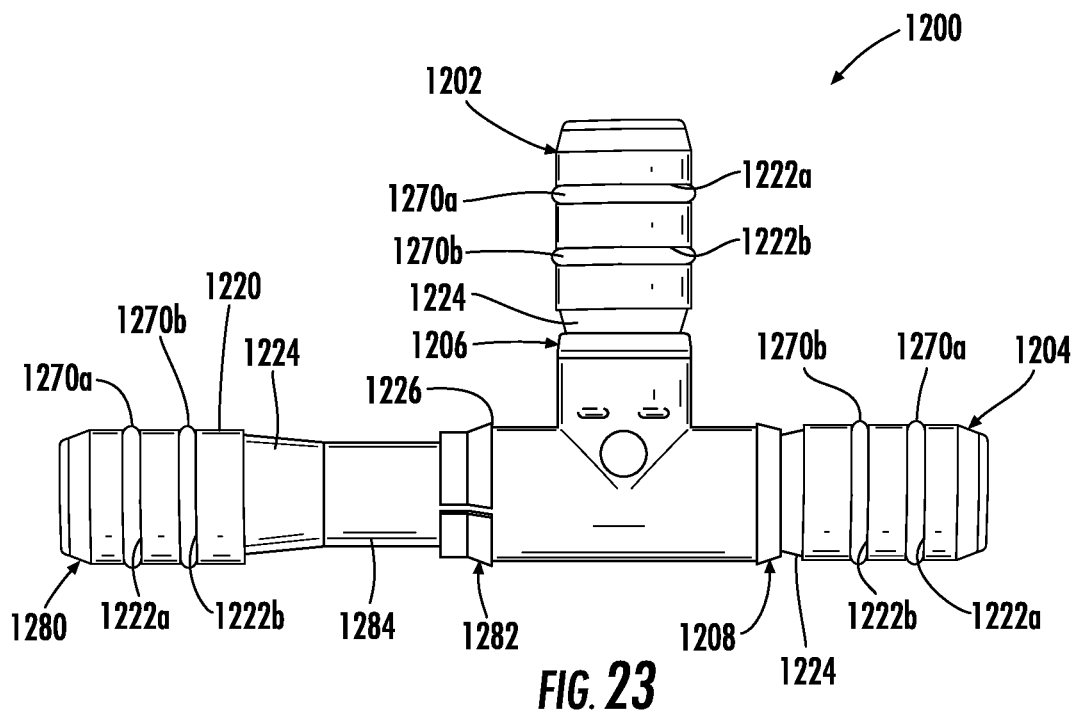
FIG. 23 is a side elevation view of another example embodiment of a fitting connectable to end portions of pipes, for example, for connecting three pipes together.

FIG. 23 illustrates another example embodiment of a fitting 1200 connectable to end portions of pipes (not shown), for example, for connecting three pipes together and allowing fluid to flow through the fitting 1200 between the pipes. The illustrated fitting 1200 has a T-shape construction and generally includes first, second, and third insert members 1202, 1204, and 1280. The fitting also includes first, second, and third sleeves 1206, 1208, and 1282 (broadly, retention member) disposed along ramp sections 1224 of the respective insert members 1202, 1204, and 1280.

Each of the insert members 1202, 1204, and 1280 again include first and second channels 1222a and 1222b configured (e.g., sized, shaped, constructed, etc.) for receiving respective sealing members 1270a and 1270b (e.g., an O-ring, gaskets, etc.) over the insert members 1202, 1204, and 1280. Each pair of sealing members 1270a and 1270b is configured to engage (e.g., sealingly engage, compressively engage, etc.) an inner surface of an end portion of a pipe at spaced apart locations (e.g., 0.25 inches apart, etc.) when the fitting 1200 is connected to the end portion of the pipe. The end portion of the pipe may tend to relax between the two sealing members 1270a and 1270b to help better seal the end portion of the pipe against the fitting 1200 and help inhibit fluid from leaving, leaking from, etc. the end portion of the pipe at the fitting 1200. As described in previous embodiments, the channels 1222a, 1222b and seals 1270a, 1270b carried therein may also be configured to provide enhanced retention capabilities of the fitting 1200 upon a pipe with increasing fluid pressure within the piping system.

In this embodiment, a body 1220 of the third insert member 1280 includes an elongate neck portion 1284 disposed between the third insert member's ramp section 1224 and a lip 1226 of the third insert member 1280. The elongate neck portion 1284 includes an outer diameter substantially matching a smaller one of the outer diameters of the ramp section 1224. This allows the third sleeve 1282 to slide along the elongate neck portion 1284 as desired (e.g., between the ramp section 1224 and the lip 1226). For example, this allows the fitting to move (e.g., small amounts of movement, etc.) relative to an end portion of a pipe coupled to the fitting 1200 at the third insert member 1280 to help facilitate coupling end portions of pipes to the first and/or second insert members 1202 and/or 1204 of the fitting 1200 (i.e., the neck portion 1284 allows the third sleeve 1282 to generally freely move along the neck portion 1284 thus providing room, give, etc. to connect pipes to each of the first and/or second insert members 1202 and/or 1204).

In other example embodiments, fittings may include insert members having wedges disposed in the insert members and moveable relative to the insert members. In these fittings, sleeves may be positioned at least partly about the insert members to move relative to the insert members and cause the wedges to move outwardly relative to the insert members and help retain the fittings on end portions of pipes. The wedges may be configured to move along ramped surfaces, for example, recessed in the insert members. For example, after a fitting is installed to an end portion of a pipe, the wedges may loosely engage an inner surface of the pipe. If force is applied to the fitting and/or pipe tending to separate the fitting and the pipe (e.g., a force pulling the fitting out of the end portion of the pipe, etc.), the sleeve (which may be frictionally engaged with the pipe) may initially move with the pipe in a forward direction along the insert member. This movement may cause the wedges to move out of the insert member and apply an increasing pressure to the inside surface of the pipe. This pressure causes the wedges to engage and/or pierce the pipe the inside surface of the pipe and resist further relative movement of the pipe and fitting.

It should be appreciated that the fittings disclosed herein may include sleeves that extend completely around insert members of the fittings, or may include sleeves that extend only partly around the insert members within the scope of the present disclosure. In addition, fittings may include ramped surfaces that extend only along a portion of insert members. For example, fittings may include ramped wedges suitable for expanding sleeves as desired to help retain fittings on end portions of pipes. Further, sleeves disclosed herein may include such materials as nylon, styrene, acrylonitrile butadiene styrene (ABS); polyvinyl siloxane (PVS), etc.

It should be further appreciated that the fittings disclosed herein may include one or more elastomeric sealing rings seated within pre-formed channels or grooves in the outer surface of the insert member, or in other example embodiments, may be integrally, or monolithically, molded or formed with insert members. In still further example embodiments, fittings may include no sealing members, or alternatively may include two or more sealing members adapted to engage the inside or outside surface of a pipe, or both. In other example embodiments, the seal(s) may extend fully or partially around the periphery of an insert member, and may be constructed of an elastomeric material or other resilient material capable of frictional engagement with a surface of a pipe.

Generally, pipe dimensions are regulated by inside diameter. However, wall thickness of pipes can vary such that two pipes with the same inside diameter may have a different outside diameter. It should also be appreciated that embodiments of fittings of the present disclosure are capable of engaging inner surfaces of pipes for help in retaining the fittings on end portions of pipes. This may help better seal and/or secure fittings to pipes (as compared to fittings that connect to only outer surfaces of pipes).

Specific dimensions, angular rotations, etc. included in the disclosure are example in nature and do not limit the scope of the present disclosure.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A fitting connectable to an end portion of a pipe, the fitting comprising:
   an insert member having a generally cylindrical wall structure formed of a relatively flexible, resilient plastic material, the insert member being configured to be received at least partly within the end portion of the pipe;
   an annular channel formed in an exterior surface of the wall structure of the insert member, a thickness of the wall structure within the annular channel being thinner than a thickness of the wall structure adjacent thereto;
   a retention member seated within the annular channel of the insert member and configured to be received at least partly within the end portion of the pipe, the retention member engaging an inner surface of the end portion of the pipe to help frictionally secure the end portion of the pipe on the insert member when the insert member is received at least partly within the end portion of the pipe;

the retention member being comprised of a flexible sealing member which imparts an increased force against the inner surface of the end portion of the pipe in response to an increase of internal fluid pipe pressure which outwardly flexes the thinner wall structure within the annular channel relative to the wall structure adjacent thereto;

a plurality of reinforcement ribs formed on an inner surface of the cylindrical wall structure of the insert member; and an additional retention member in the form of a slidably moveable sleeve carried by the insert member and configured to be received at least partly within the end portion of the pipe, the moveable sleeve engaging the inner surface of the end portion of the pipe to help frictionally secure the end portion of the pipe on the insert member when the insert member is received at least partly within the end portion of the pipe.

2. The fitting of claim 1, wherein the retention member is constructed of an elastomeric material, and the plastic material from which the insert member is formed is more rigid than the retention member.

3. The fitting of claim 1, wherein the retention member is comprised of an elastomeric sealing ring.

4. The fitting of claim 1, wherein the thickness of the wall structure of the insert member at the annular channel is within the approximate range of 48 to 61 percent of the thickness of the wall structure adjacent thereto.

5. The fitting of claim 1, wherein the plurality of reinforcement ribs protrude radially inward from the cylindrical wall structure along an axis extending longitudinally therethrough.

6. The fitting of claim 1, wherein the insert member includes a tapered ramp section upon which the sleeve carried.

7. The fitting of claim 1, further comprising a housing coupled to the insert member, the end portion of the pipe being received at least partly within the housing when the insert member is received at least partly within the end portion of the pipe.

8. The fitting of claim 7, including at least one additional retention member coupled to the housing and configured to engage an outer surface of the end portion of the pipe to help resist movement of the fitting relative to the end portion of the pipe.

9. The fitting of claim 7, wherein the end portion of the pipe is received generally between the housing and the insert member when the insert member is received at least partly within the end portion of the pipe, the housing and the insert member being operable to squeeze the end portion of the pipe therebetween to resist movement of the end portion of the pipe off the insert member.

10. A fitting connectable to an end portion of a pipe, the fitting comprising:

an insert member having a generally cylindrical wall structure formed of a relatively flexible, resilient material, the insert member being configured to be received at least partly within the end portion of the pipe, and the insert member having an annular channel formed in an exterior surface thereof, wherein a thickness of the wall structure within the annular channel is thinner than a thickness of the wall structure adjacent thereto;

a retention member in the form of an elastomeric sealing member being carried within the annular channel of the insert member and configured to be received at least partly within the end portion of the pipe, the sealing member engaging an inner surface of the end portion of the pipe and being operable with the insert member to impart an increased force against the inner surface of the end portion of the pipe in response to outward flexing of the thinner wall structure within the annular channel relative to the wall structure adjacent thereto caused by an increase of internal fluid pipe pressure, thereby automatically increasing frictional retention of the end portion of the pipe on the insert member as internal fluid pipe pressure increases during use;

a plurality of reinforcement ribs formed on an inner surface of the cylindrical wall structure of the insert member; and an additional retention member in the form of a slidably moveable sleeve carried by the insert member and configured to be received at least partly within the end portion of the pipe, the moveable sleeve engaging the inner surface of the end portion of the pipe to help frictionally secure the end portion of the pipe on the insert member when the insert member is received at least partly within the end portion of the pipe.

11. The fitting of claim 10, wherein the annular channel includes a base section formed integral with an interior surface of the wall structure such that the base section will flex slightly radially outward in response to an increase in internal fluid pressure within the end portion of the pipe.

12. The fitting of claim 10, wherein the plurality of reinforcement ribs protrude radially inward from the cylindrical wall structure along an axis extending longitudinally therethrough.

13. The fitting of claim 12, wherein the insert member is constructed of a resiliently, flexible plastic material.

14. The fitting of claim 13, wherein the insert member is constructed of acrylonitrile butadiene styrene.

15. The fitting of claim 10, wherein the insert member has a central axis and the moveable sleeve is axially slidable along a diametrically tapered section of the insert member.

* * * * *

UNITED STATES PATENT AND TRADEMARK OFFICE
CERTIFICATE OF CORRECTION

| | | |
|---|---|---|
| PATENT NO. | : 9,297,486 B2 | Page 1 of 1 |
| APPLICATION NO. | : 13/465163 | |
| DATED | : March 29, 2016 | |
| INVENTOR(S) | : Thomas A. King et al. | |

It is certified that error appears in the above-identified patent and that said Letters Patent is hereby corrected as shown below:

In the Claims

Column 21, Claim 6, Line 35, please insert --is-- directly after "sleeve".

Signed and Sealed this
Seventh Day of June, 2016

Michelle K. Lee
*Director of the United States Patent and Trademark Office*